May 8, 1956 W. W. PHARIS 2,744,963

MULTI-OFFICE TELEPHONE SYSTEM

Filed Dec. 14, 1953 13 Sheets-Sheet 1

INVENTOR.
WILLIAM W. PHARIS
BY F. H. Henson
AGENT

May 8, 1956 W. W. PHARIS 2,744,963

MULTI-OFFICE TELEPHONE SYSTEM

Filed Dec. 14, 1953 13 Sheets-Sheet 2

TRUNK CIRCUIT 20

May 8, 1956 W. W. PHARIS 2,744,963

MULTI-OFFICE TELEPHONE SYSTEM

Filed Dec. 14, 1953 13 Sheets-Sheet 3

TRUNK CIRCUIT 40

May 8, 1956 W. W. PHARIS 2,744,963

MULTI-OFFICE TELEPHONE SYSTEM

Filed Dec. 14, 1953 13 Sheets-Sheet 5

May 8, 1956 W. W. PHARIS 2,744,963

MULTI-OFFICE TELEPHONE SYSTEM

Filed Dec. 14, 1953 13 Sheets-Sheet 8

May 8, 1956 W. W. PHARIS 2,744,963

MULTI-OFFICE TELEPHONE SYSTEM

Filed Dec. 14, 1953 13 Sheets-Sheet 10

FIG. 10 TRUNK CIRCUIT 100

May 8, 1956 W. W. PHARIS 2,744,963

MULTI-OFFICE TELEPHONE SYSTEM

Filed Dec. 14, 1953 13 Sheets-Sheet 13

United States Patent Office 2,744,963

Patented May 8, 1956

2,744,963

MULTI-OFFICE TELEPHONE SYSTEM

William W. Pharis, Rochester, N. Y., assignor, by mesne assignments, to General Dynamics Corporation, a corporation of Delaware Application December 14, 1953, Serial No. 397,951

14 Claims. (Cl. 179—27)

The present invention relates to multi-office telephone systems in general and more particularly to interoffice trunk circuits for use between toll and tandem offices and between tandem and community dial offices.

In such a system it is desirable, for economic reasons, to utilize the same trunk circuits between the tandem and community dial offices for extending calls to the community dial office from either local dial equipment in the tandem office or from an operator position in a distant toll office. The switching equipment in the community dial office is arranged to operate in one manner if the extended call is from a local subscriber in the tandem office and in a different manner if the extended call originated at an operator position. For example, automatic ringing and conversation timing might be employed on a local call while delayed ringing, busy verification, and cancellation of conversation timing might be desired features on a toll call.

It is necessary, therefore, to identify the origin of the extended call over the trunk line to the community dial office so that the switching equipment therein will function in the desired manner.

Accordingly it is a general object of this invention to provide a new and improved system for identifying the class of calls originating in a first office to switching equipment in a distant office.

The invention accomplishes the above object by providing a two way trunk circuit, accessible to both local dial equipment and a toll board on outgoing calls, which identifies a toll call to the distant office by automatically sending a preliminary impulse over the trunk line. In the disclosed embodiment of the invention the trunk circuit is connected to the distant office by a two conductor trunk line of the type in which the two conductors form a communication channel and a signal path is derived therefrom. As is well known in the art, this trunk line may be either composited or simplexed and the derived signal path, or dial leg, will utilize one trunk line conductor or the two trunk line conductors in parallel respectively.

A toll call extended to the trunk circuit is identified by a marking potential on the HS conductor at the time of seizure. Upon seizure, the trunk circuit functions to establish a current flow over the derived signal path to seize the trunk circuit in the distant office. If the call is a toll call, this current flow is automatically interrupted a short time interval after seizure to transmit a preliminary impulse to the distant office trunk circuit.

The trunk circuit in the distant office when seized over the derived signal path immediately closes a loop circuit to its associated incoming selector and initiates the timing cycle of a timing device. The timing device serves to distinguish between a preliminary impulse and subsequent switch directing impulses received over the derived signal path. If an impulse, which would necessarily be a preliminary impulse, is received over the derived signal path before the completion of the timing cycle, it is utilized to operate a toll marking relay. The timing device also prevents the repeating of the preliminary impulse to the incoming selector by maintaining a shunt across the impulsing contacts, which control the loop to the incoming selector, during the timing cycle. The timing cycle is approximately of the same duration as the seizure time of the incoming selector so that the interdigit time is not extended materially by the inclusion of the toll marking feature.

The operated toll marking relay connects a marking potential to the HS conductor of the incoming selector and thence to a subsequently seized connector to identify the call as a toll call.

The invention, both as to its organization and method of operation together with objects and advantages thereof, will best be understood from the following description when read in conjunction with the accompanying drawings.

The drawings consist of thirteen figures on thirteen sheets and when arranged in numerical order from left to right show the present invention.

Figure 13:
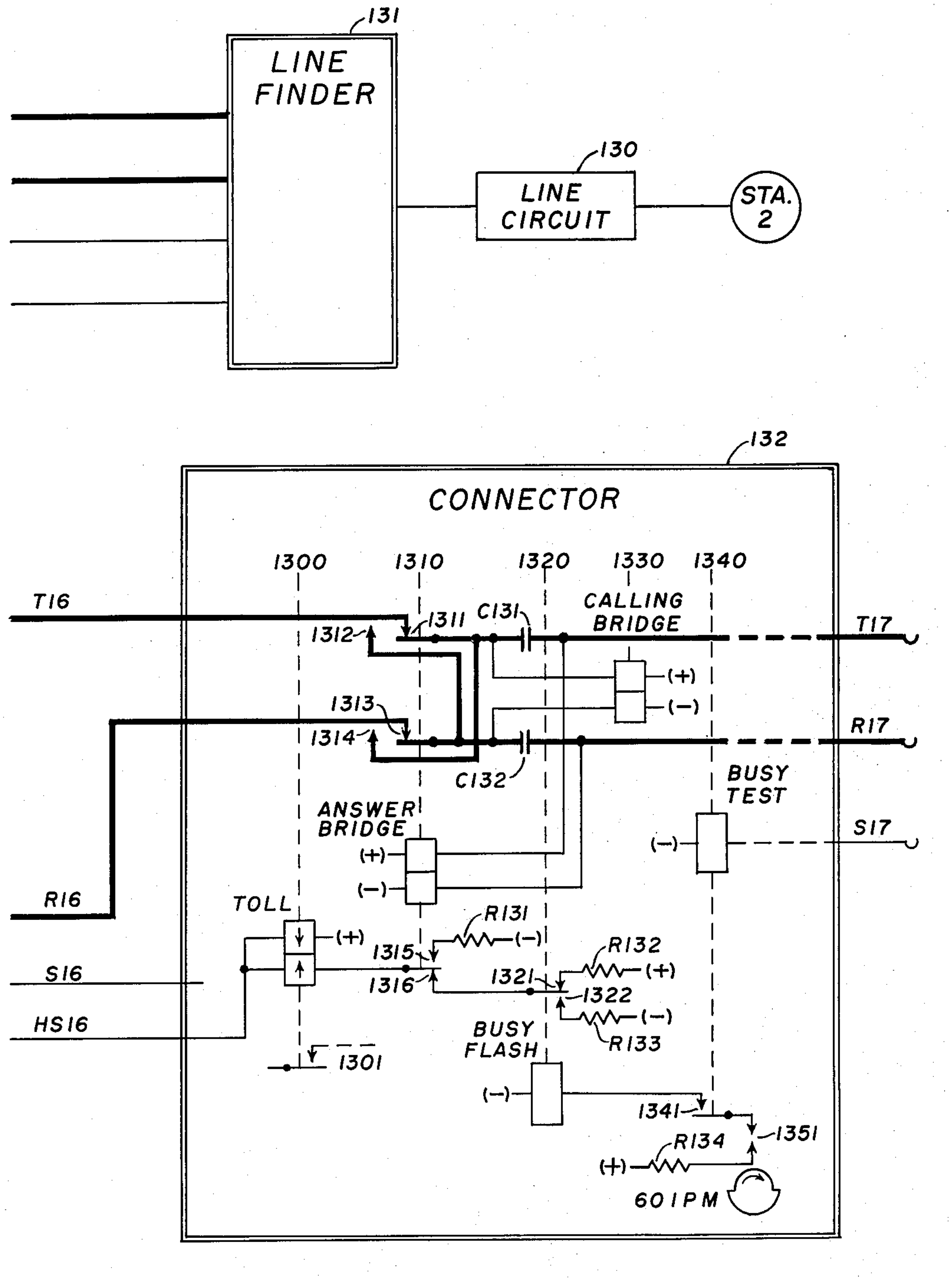

Figs. 9, 10, 11, and 12 show composite equipment, and a two way trunk circuit in a community dial office;

Fig. 13 shows switching equipment in a community dial office in block and fragmentary form.

Figure 1:
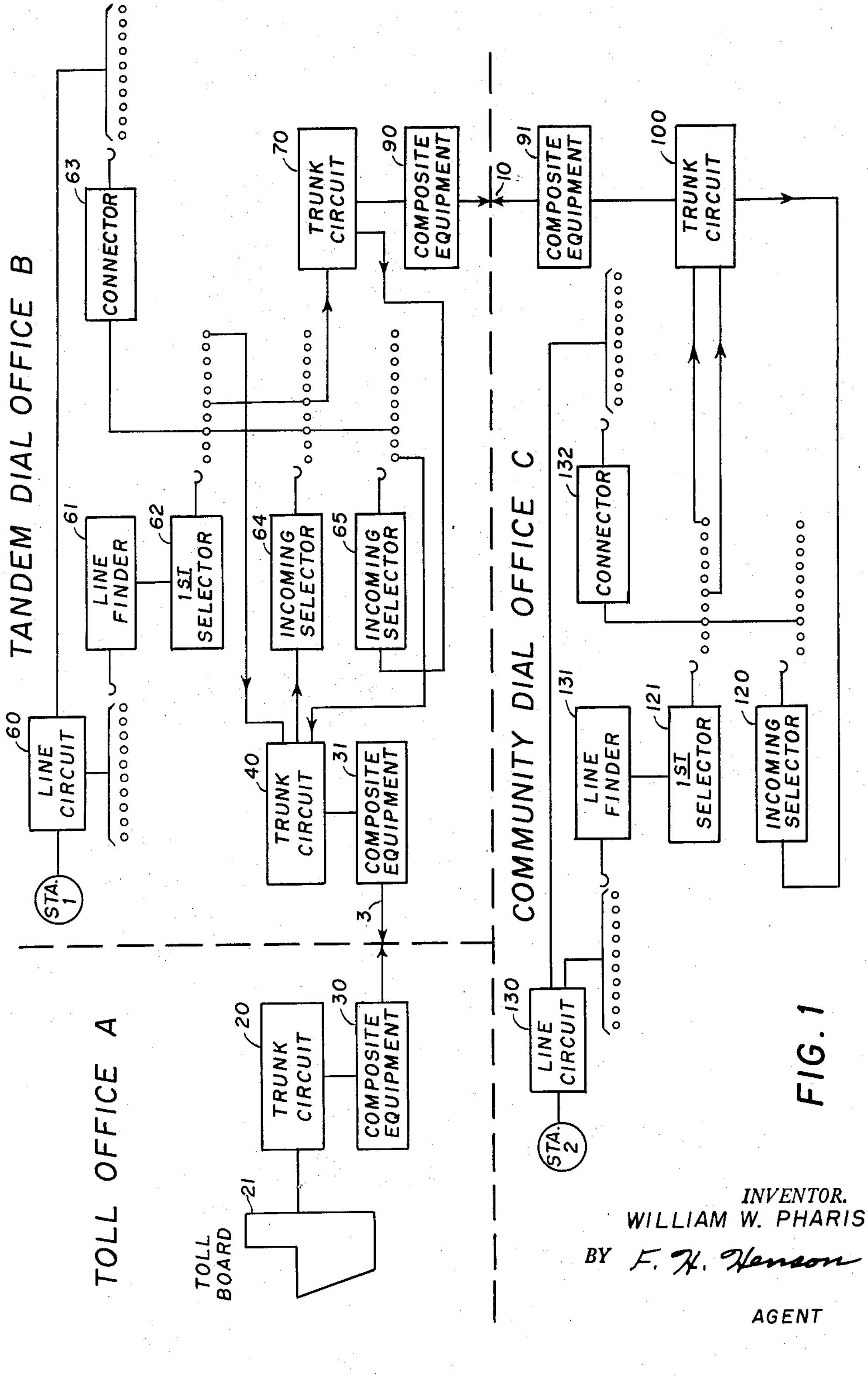
Fig. 1 shows the trunking diagram of the described system.

The general operation of the system can best be understood by reference to the trunking diagram of Fig. 1. As shown, the system comprises toll office A, tandem office B, and community dial office C. Trunk line 3 interconnects offices A and B and trunk line 10 interconnects offices B and C.

The toll board 21 in toll office A may be of the type shown and described in the copending Reagan application, Serial No. 331,627, filed January 16, 1953, and assigned to the same assignee as the present invention. Calls from the toll board for subscribers in either offices B or C are routed from the toll board, through two way trunk circuit 20. Trunk circuit 20 is connected by trunk line 3 to two way trunk circuit 40 in tandem office B and thus to incoming selector 64 which is directly associated with trunk circuit 40.

Since trunk circuit 40 is accessible only to the toll board in office A, it is arranged to mark all incoming calls to the tandem office as toll calls by connecting a marking potential to the control conductor HS which extends through the switching equipment. Trunk circuit 40 is arranged to connect the marking potential to the HS conductor when the first series of switch directing impulses is received over the trunk line and to disconnect the marking when answer supervision is received from succeeding circuits.

In the tandem office B, the third bank level of incoming selector 64 is shown connected to local and toll connector 63 to enable the toll operator in office A to extend calls to tandem office subscribers, such as Sta. 1. The toll marking provided in trunk circuit 40 will cause connector 63 to function as a toll connector. The fifth level of incoming selector 64 is shown connected to trunk circuit 70 to enable the toll operator in office A to extend calls to local subscribers in community dial office C, such as Sta. 2. The toll marking provided in trunk circuit 40 causes the trunk circuit 70 to automatically transmit a preliminary impulse on seizure over trunk line 10 to trunk circuit 100 for toll marking purposes. It is necessary that the toll marking be present on the HS conductor at the time of seizure of trunk circuit 70. This is assured since the marking is locked on in trunk circuit 40 until answer supervision is returned to that circuit.

Local subscribers in tandem office B can extend calls to other local subscribers in office B through the local switch train comprising line finder 61, first selector 62, and from the third level of first selector 62 to local and toll connector 63.

The fifth level of first selector 62 connects to trunk circuit 70 to enable subscribers in tandem office B to extend calls to subscribers in community dial office C. It is to be noted that incoming selector 64 and first selector 62 have a common access to trunk circuit 70. A toll call, from incoming selector 64, is identified solely by the marking potential on the HS conductor.

In community dial office C, incoming selector 120 is directly associated with trunk circuit 100. The third level of incoming selector 120 is shown connected to local and toll connector 132. If trunk circuit 100 receives a preliminary impulse over trunk line 10, it connects a marking potential to the HS conductor extended through incoming selector 120 to cause connector 132 to be operated as a toll connector in extending a call to a subscriber station, such as Sta. 2. If a preliminary impulse is not received over trunk line 10, trunk circuit 100 does not connect a marking potential to the HS conductor and connector 132 operates as a local connector.

Local subscribers in community dial office C can extend calls to other local subscribers in office C through the local switching equipment comprising line finder 131, first selector 121, and the third level of first selector 121 to local and toll connector 132. The fifth level of first selector 121 is shown connected to a first outgoing access of trunk circuit 100 for the purpose of routing calls from local subscribers in office C to local subscribers in office B. On a call which is incoming from office C to office B, incoming selector 65 is directly associated with trunk circuit 70. The third level of incoming selector 65 is shown connected to connector 63 which, as previously mentioned, has access to subscribers' lines such as Sta. 1.

The subscribers in office C have access to the toll office A through level zero of first selector 121 which connects to the second outgoing access of trunk circuit 100. Trunk circuit 100 is arranged for automatic impulse sending when seized over its second outgoing access. The automatic impulse is repeated by trunk circuit 70 to incoming selector 65 which steps to its first level and searches in that level for an idle trunk circuit, such as trunk circuit 40, extending to the toll office A.

Subscribers in office B also have access to the toll office A through level zero of first selector 62 which also connects to trunk circuit 40.

In the drawings and description, thhe exchange battery is shown as plus and minus and described as ground and battery, respectively. It is to be understood that in this system the positive terminal of the battery is grounded and is, therefore, referred to as ground. The negative terminal of the battery is referred to as battery.

A detailed description of the system follows.

*Call from toll Board 21 in toll office A to Sta. 2 in community dial office C*

Figure 2:
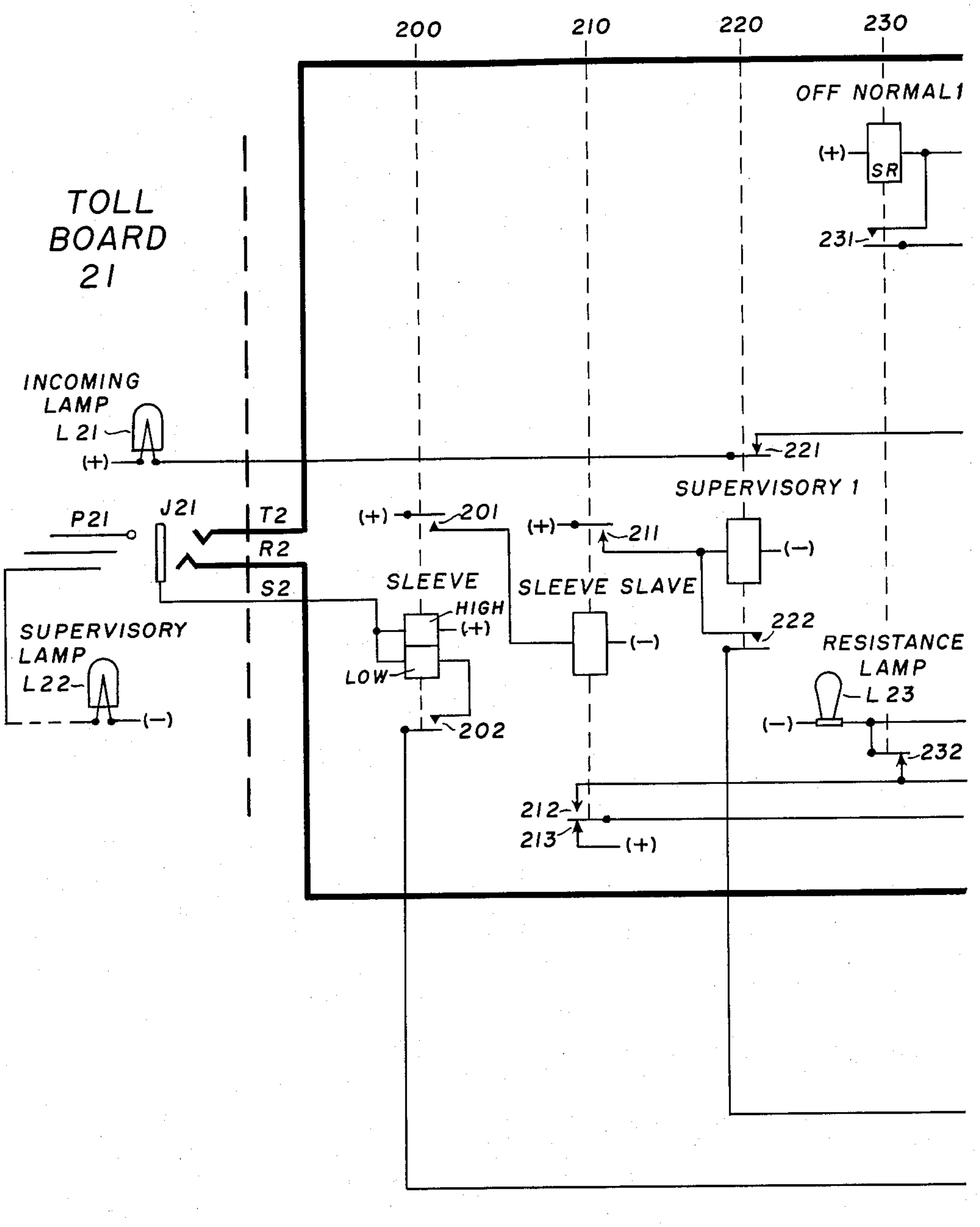
Fig. 2 shows a skeletonized version of a toll cord circuit at a toll board and a portion of a two way trunk circuit in a toll office.
Figure 3:
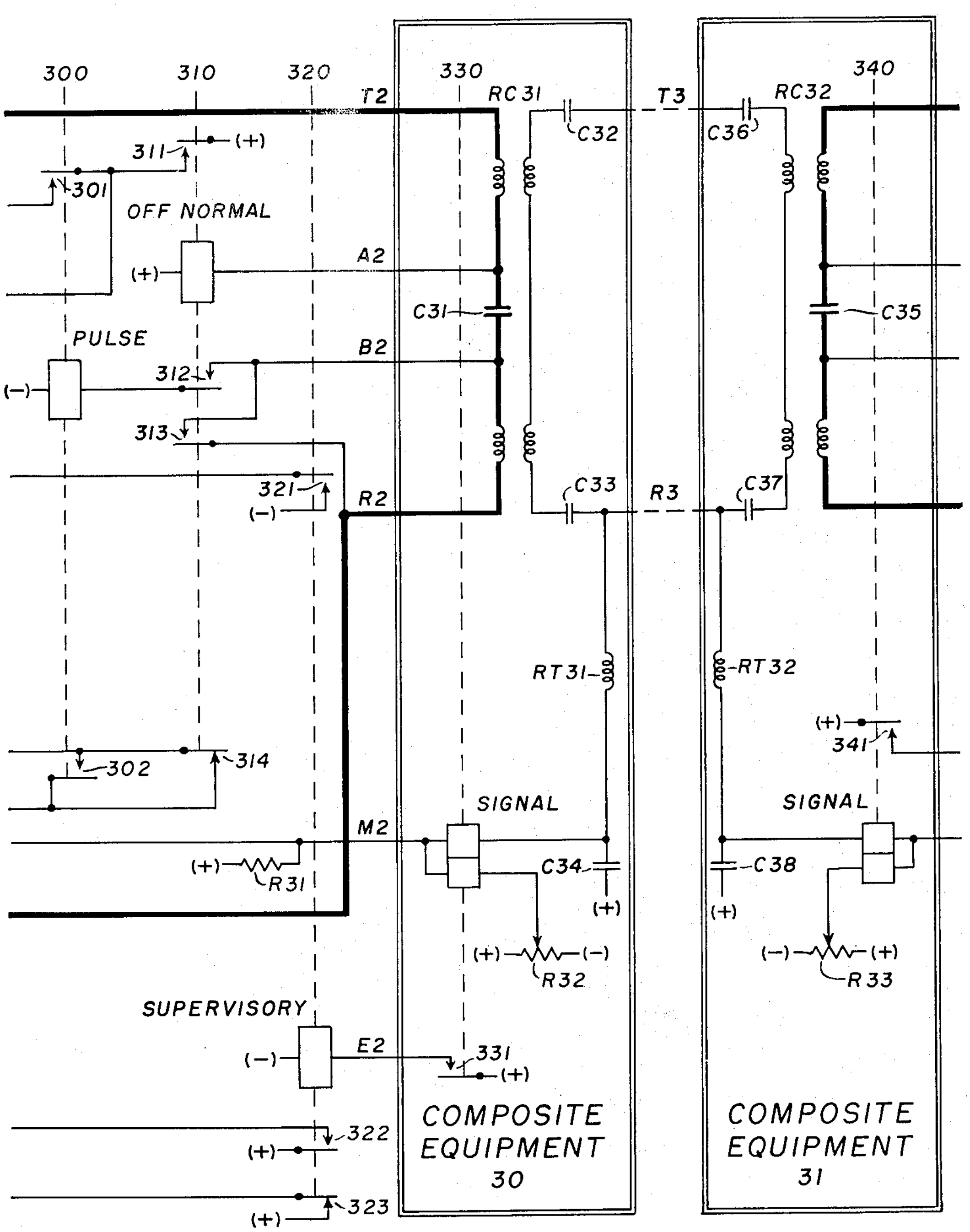
Fig. 3 shows the remainder of a toll office two way trunk circuit and composite equipment.
Figure 4:
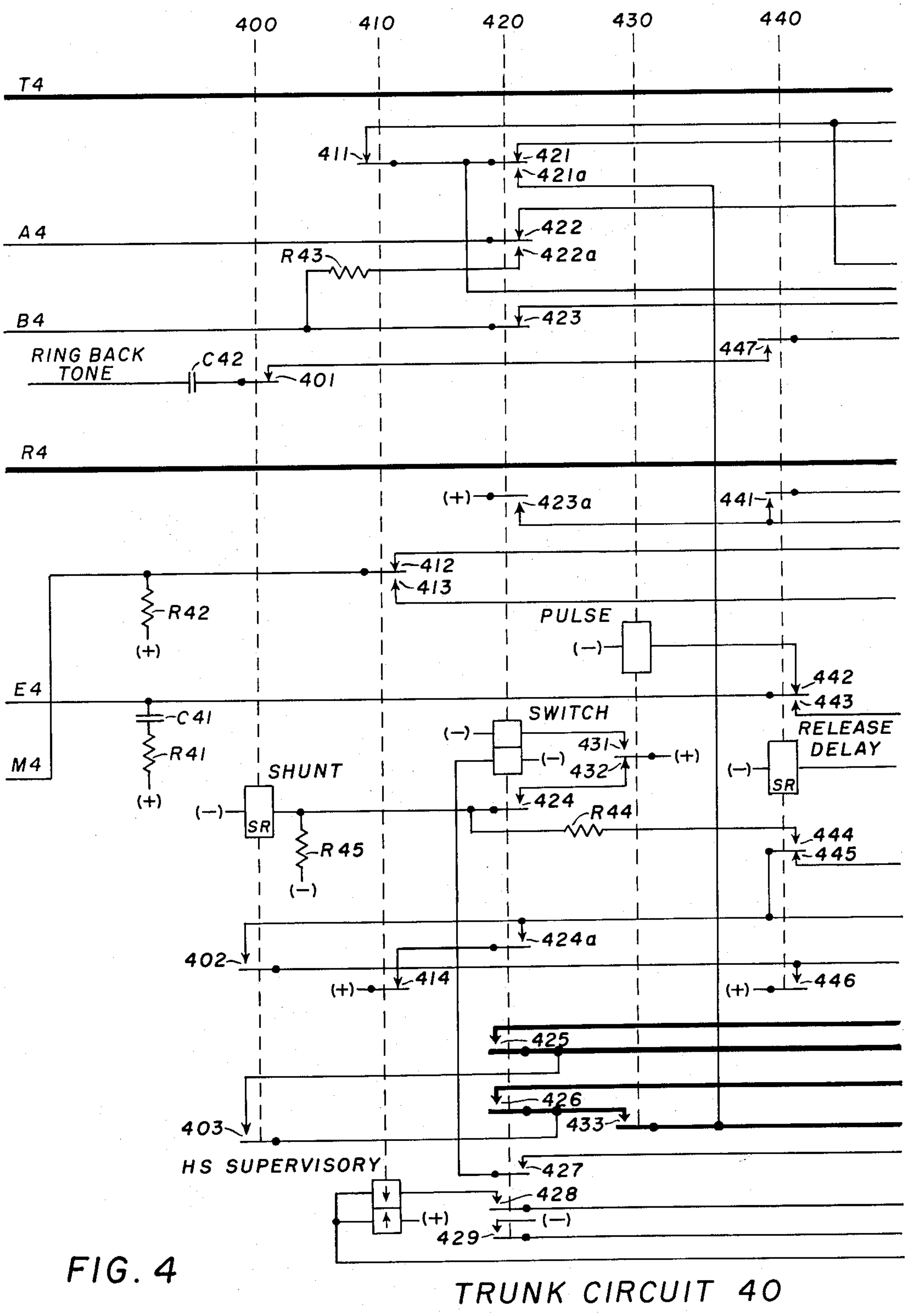
Figs. 4 and 5 show a two way trunk circuit in a tandem office terminating a trunk line from a toll office.
Figure 5:
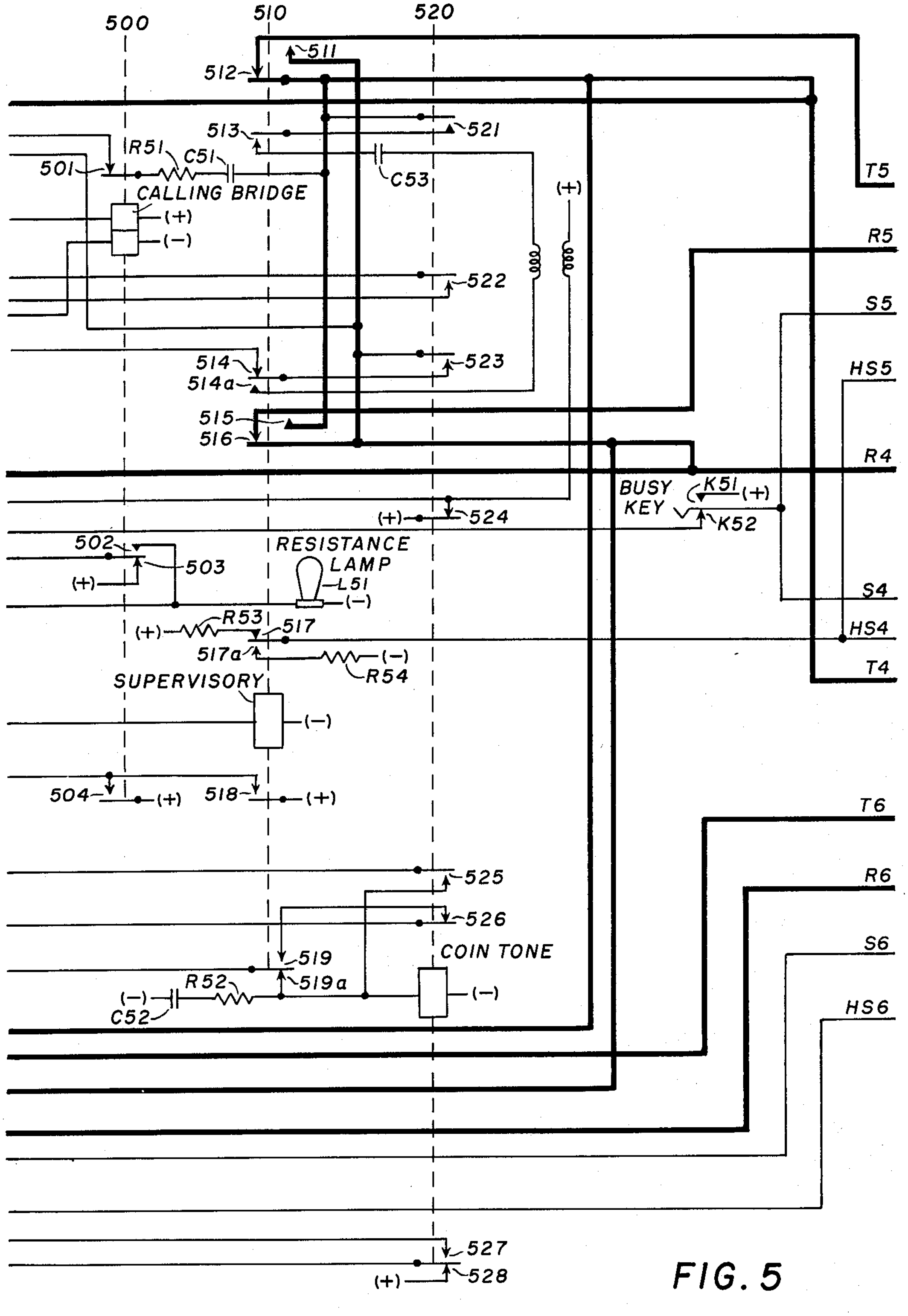

Calls extended from the toll board in office A to the subscriber's station Sta. 2 in office C are routed through trunk circuits 20 and 40, incoming selector 64, trunk circuits 70 and 100, incoming selector 120, and connector 132 to line circuit 130 which is associated with Sta. 2. Referring to Fig. 2, when the operator plugs a calling cord, such as P21, into jack J21, which is associated with trunk circuit 20 at the toll position, sleeve relay 200 operates in a circuit which extends from ground through the high resistance winding of relay 200 over the sleeve conductor S2 and through the supervisory lamp L22 to battery. At its operated make contacts 202, relay 200 extends ground from break contacts 323 on unoperated relay 320 and through its low resistance winding to the lamp L22. Lamp L22 is illuminated in this low resistance circuit.

Sleeve slave relay 210 operates over an obvious circuit from ground on operated make contacts 201 of relay 200. Battery, through resistance lamp L23, break contacts 232 on unoperated relay 230 or break contacts 314 on unoperated relay 310, operated make contacts 212 on relay 210, is connected to the M2 conductor which extends to the composite equipment 30. In composite equipment 30 the battery is further extended through the upper winding of the polar duplex signal relay 330, retard coil RT31, the derived signal path on conductor R3 of the trunk line, retard coil RT32, the upper winding of polar duplex signal relay 340, over the M4 conductor, break contacts 412 on unoperated relay 410, and through break contacts 503 on unoperated relay 500 to ground. Polar duplex signal relay 340 operates in this circuit but polar duplex signal relay 330 does not operate because of the opposing connections of its windings.

In trunk circuit 20, supervisory 1 relay 220 operates from ground through operated make contacts 211 on relay 210. Relay 220 opens the path to incoming lamp L21 at its break contacts 221 and prepares a locking circuit for itself through its operated contacts 222.

The operation of polar duplex relay 340 in composite equipment 31 serves to connect ground through its operated make contacts 341 to the E4 conductor, through break contacts 442 on unoperated relay 440, and through the winding of the pulse relay 430 to battery. Relay 430 operates in this circuit and at its operated make contacts 431 closes an obvious operating circuit for the upper winding of switch relay 420. A loop seizing circuit is now closed for the calling bridge relay 600 in incoming selector 64 responsive to the operation of the relays 430 and 420 in trunk circuit 40. The operating circuit for calling bridge relay 600 extends from ground through the upper winding of relay 600, the tip conductor T6, operated make contacts 425 on relay 420, the tip conductor T4, the upper right winding of repeat coil RC32 in composite equipment 31, the A4 conductor, operated make contacts 422A on relay 420, resistor R43, conductor B4, the lower right winding of repeat coil RC32, ring conductor R4, operated make contacts 426 of relay 420, operated make contacts 433 of relay 430, ring conductor R6, and through the lower winding of relay 600 to battery.

Operation of switch relay 420 also serves to mark the sleeve conductor of the outgoing access of trunk circuit 40 in the banks of selectors 65 and 62 as busy. This busy marking is accomplished over a circuit from ground on operated make contacts 423A of relay 420, and through break contacts K52 of the unoperated busy key to the sleeve conductors S5 and S4 in parallel.

The operator now operates the dial key associated with the position circuit to condition trunk circuit 20 for dialing. As shown in the previously mentioned Reagan application, the operation of the dial key places resistance battery on the tip conductor T2 and ground through the dial springs of the dial, at the position, to the ring conductor R2. Resistance battery on the tip conductor T2 and through the upper left winding of repeat coil RC31 in composite equipment 30, the A2 conductor, and through the winding of the off-normal relay 310 to ground operates relay 310. The pulse relay 300 is now operated over a circuit extending from the aforementioned ground on the ring conductor R2, through the lower left winding of repeat coil RC31, the B2 conductor, operated make contacts 312 on relay 310, and through its winding to battery.

Off-normal 1 relay 230 operates in a circuit extending from ground on operated make contacts 311 of relay 310, through operated make contacts 301 of relay 300, and through its winding to battery. The operation of relays 310, 300 and 230, in that order, insures that a false pulse will not be transmitted over the M2 conductor while shifting the battery connection for that conductor to be under control of relay 300. Make contacts 302 on relay 300 close an alternate circuit for the battery through resistance lamp L23 before break contacts 232 on relay 230 open said circuit.

The operation of the dial at the operator's position serves to interrupt the ground connection to the ring conductor R2 and thereby release and operate the pulse relay 300 in accordance with the dial impulses. Relay 300 repeats the impulses to the M2 conductor at its make contacts 302. Each time that make contacts 302 are released, polar duplex signal relay 340 in composite equipment 31 is released. The impulses are repeated at make contacts 341 of relay 340 to the E4 conductor and consequently cause the release and operation of pulse relay 430 in trunk circuit 40 in accordance with the dial impulses. Relay 430 repeats the impulses to the calling bridge relay 600 in incoming selector 64 at its make contacts 433.

The first release of relay 430 in response to the first impulse received over the derived signal path closes ground through break contacts 432 on relay 430, operated make contacts 424 on relay 420, and the winding of shunt relay 400 to battery. Relay 400 operates and at its make contacts 403, shunts the right-hand windings of repeat coil RC32 during impulsing to improve the quality of the impulses repeated to calling bridge relay 600. Shunt relay 400 is slow-release and is designed to operate on the first impulse of a series of impulses and remain operated over the duration of the series of impulses.

Responsive to the operation of shunt relay 400, an operating circuit is closed to the coin tone relay 520. This circuit extends from ground on break contacts 414 of unoperated relay 410, through operated make contacts 424A on relay 420, operated make contacts 402 on relay 400, break contacts 519A on unoperated relay 510, and through the winding of relay 520 to battery.

Toll marking potential is now connected to the HS6 conductor extending to the incoming selector 64 for the purpose of identifying the extended call as a toll call to succeeding circuits. The marking circuit extends from battery on operated make contacts 429 of relay 420, through operated make contacts 527 of relay 520, the upper winding of differentially connected relay 410, operated make contacts 428 of relay 420 to the HS6 conductor.

Assuming that the operator dials the digit "5," a suitable switch in incoming selector 64 is directed by the impulses produced by calling bridge relay 600 to position itself in front of a fifth level of contacts. The switch then searches for and switches through to an idle trunk circuit in that level, such as trunk circuit 70.

In trunk circuit 70, calling bridge relay 740 operates in a circuit extending from ground through its upper winding, break contacts 831 on unoperated relay 830, the A9 conductor, the upper left winding of repeat coil RC91, tip conductor T9, the break portion 701 of a make-before-break combination on unoperated relay 700, tip conductor T8 over the previously described loop circuit in trunk circuit 40, the ring conductor R8, the break portion 703 of a make-before-break combination on relay 700, the ring conductor R9, the lower left winding of repeat coil RC91, conductor B9, break contacts 832 on unoperated relay 830, and through the lower winding of relay 740 to battery.

The toll marking which was applied to the control conductor HS6 in trunk circuit 40 is switched through upon seizure to the corresponding control conductor HS8 in trunk circuit 70. The toll marking battery potential is routed from conductor HS8 through break contacts 705 on unoperated relay 700, and through the upper winding of toll relay 710 to ground. Relay 710 operates in this circuit to identify the call as a toll call to succeeding circuits in a manner which will be described subsequently.

In response to the operation of calling bridge relay 740, battery is connected to the M9 lead to seize trunk circuit 100 in the community dial office. This circuit extends from battery through resistance lamp L71, operated make contacts 741 on relay 740, break contacts 803 on unoperated relay 800, break contacts 822 on unoperated relay 820, the M9 conductor, through the upper winding of the polar duplex signal relay 900, retard coil RT91, the derived signal conductor R10 of the trunk line 10, retard coil RT92, the upper winding of polar duplex signal relay 910, the M12 conductor, break contacts 1043 on unoperated relay 1040, and through break contacts 1112 on relay 1110 to ground. Polar duplex signal relay 910 operates in this circuit and its make contacts 911 closes ground to the E12 conductor through break contacts 1122 on unoperated relay 1120 and through the winding of the pulse-in relay 1020 to battery. Pulse-in relay 1020 operates in this circuit and at its make contacts 1021 closes an obvious operating circuit for switch relay 1030.

A loop seizing circuit is now closed to the calling bridge relay 1220 in incoming selector 120. This circuit extends from ground through the upper winding of relay 1220, tip conductor T15, operated make contacts 1036 on relay 1030, tip conductor T12, the upper right winding of repeat coil RC92, conductor A12, resistor R93, the upper winding of relay 1040, operated make contacts 1032A of relay 1030, conductor B12, lower right winding of repeat coil RC92, ring conductor R12, operated contacts 1023 on relay 1020 or break contacts 1007 on unoperated relay 1000, operated make contacts 1037 on relay 1030, the ring conductor R15, and through the lower winding of relay 1220 to battery. Operation of the calling bridge relay 1220 in incoming selector 120 initiates the seizure of that circuit.

Returning to trunk circuit 70, the operation of the calling bridge relay 740 serves to close an operating circuit through its make contacts 743 to the release delay relay 720. Relay 720 is a sleeved relay and is, therefore, slightly slow operating. The previously mentioned seizure of the relays in trunk circuit 100 and in the incoming selector will normally take place during the operate time of relay 720. In response to the operation of relay 720, ground through operated make contacts 712 of toll relay 710, operated make contacts 723 of relay 720, break contacts 732 of unoperated relay 730, is now connected through the upper winding of the toll assist relay 800 to battery. At operated make contacts 724, relay 720 closes an operating ground to the release delay assist relay 730. Relay 730 is also slightly slow operate. The energizing circuit for relay 800 which was completed through break contacts 732 on relay 730 will be closed for the interval of time corresponding to the operate time of relay 730.

The operation of relay 800 results in sending a preliminary impulse over the M9 lead to identify the extended call as a toll call to the equipment in community dial office C. Operated make contacts 802 on relay 800 connect ground through break contacts 822 on unoperated relay 820, and over the previously described circuit extending from conductor M9, to release the polar duplex signal relay 910 in composite equipment 91. The release of relay 910 causes the impulse to be repeated to the pulse-in relay 1020 by removing ground from conductor E12 at contacts 911. In trunk circuit 70, relay 730 operates and at contacts 732 opens the energizing circuit for the upper winding of relay 800. At operated make contacts 801, relay 800 short circuits its secondary winding to make the relay slightly slow-release. Upon the restoration of relay 800, the M9 conductor is again connected to battery by break contacts 803. Thus, a preliminary impulse, the duration of which is controlled by the operate time of relay 730 and the release time of relay 800, is transmitted over the derived signal path to the trunk circuit 100.

In trunk circuit 100, the operation of relay 1030, upon seizure, closes a ground through its operated make contacts 1035, and through the break portion 1005 of a make-before-break combination on relay 1000 and through the winding of first toll delay relay 1010 to battery. Relay 1010 operates in this circuit and its operated make contacts 1013 closes an energizing circuit for the second toll delay relay 1000. If a preliminary impulse is received over the trunk line during the operate time of the second toll delay relay 1000, ground on break contacts 1022 of relay 1020, which releases in response to the preliminary impulse, is connected through operated make contacts 1034 on relay 1030, the break portion 1003 of a make-before-break combination on relay 1000, and the winding of toll incoming relay 920 to battery. Relay 920 closes a locking circuit through its operated make contacts 922 to the ground on operated make contacts 1035 of relay 1030. Relay 1000 operates after a short interval and at contacts 1005 opens the energizing circuit to relay 1010. With both relays 1000 and 1010 of the timing device still operated, a preliminary impulse may still be connected to the toll incoming relay 920 over a circuit extending from ground on the previously mentioned contacts 1022 and 1034 and through now operated contacts 1004 on relay 1000 and operated make contacts 1012 on relay 1010. Relay 1000 locks itself operated through its make contacts 1006 to the ground on contacts 1035 of relay 1030. Relay 1010 finally releases to complete the period during which toll marking may be received from trunk circuit 70.

It is to be noted that even though the pulse-in relay 1020 released during the preliminary impulse and thus released its make contacts 1023, the loop to the calling bridge relay 1220 in incoming selector 120 was not opened. When relay 1010 first operated, it closed its make contacts 1014 to shunt contacts 1023 on relay 1020. This shunt was maintained until relay 1010 released at the termination of the timing cycle. The operation of relay 1000 and the consequent opening of its break contacts 1007 removed a second shunt from the pulsing contacts 1023 so that, at the termination of the timing cycle as measured by the release of relay 1010, the pulsing contacts 1023 will not be shunted and digit impulses received over the dial leg can be repeated to the incoming selector.

The operation of switch relay 1030, upon seizure of the circuit, connects ground through its make contacts 1033, break contacts on the unoperated busy key to the sleeve conductor S13 to mark the trunk circuit 100 as busy in the banks of first selector 121. Also, at its operated make contacts 1038, the switch relay 1030 closes a holding circuit for its lower winding to the sleeve conductor S15 which is grounded by contacts on the delay relay in incoming selector 120 in the well known manner.

The circuits are now in condition to receive dial pulses from the operator's position. The dial impulses are repeated by relay 300 in trunk circuit 20, polar duplex relay 340 in composite equipment 31, pulse relay 430 in trunk circuit 40, calling bridge relay 740 in trunk circuit 70, polar duplex relay 910 in composite equipment 91, pulse-in relay 1020 in trunk circuit 100 and by calling bridge relay 1220 in incoming selector 120 to direct a suitable switch in the incoming selector.

In each of the trunk circuits a slow-release relay is operated on the first impulse of each series of impulses and is designed to remain operated over the series of impulses to shunt out various inductive components in the impulsing circuits and thereby improve the quality of the impulses repeated to subsequent circuits. In trunk circuit 40 the operating circuit for shunt relay 400 was previously described. In trunk circuit 70 the first release of the calling bridge relay 740 closes an operating circuit for the shunt relay 810 over a circuit extending from ground through break contacts 744 of relay 740, operated make contacts 725 of relay 720, and through the winding of relay 810 to battery. At its operated make contacts 811, relay 810 shunts the upper left winding of repeat coil RC91 during the impulses of each digit. In trunk circuit 100 the release of pulse-in relay 1020 on the first impulse of a series of impulses closes an operating circuit for the shunt relay 1100. The operating circuit extends from ground on break contacts 1022 of relay 1020, through operated make contacts 1034 on relay 1030, operated make contacts 1004 on relay 1000, break contacts 1011 on unoperated relay 1010, and the winding of relay 1100 to battery. Operated relay 1100 shunts out the right-hand windings of repeat coil RC92 in a circuit extending from the tip conductor T12 through operated make contacts 1101 on relay 1100, break contacts 1202 on unoperated relay 1200, operated make contacts 1002 on relay 1000 to the ring conductor R12.

Since the call incoming to trunk circuit 100 is a toll call, identified by the fact that the toll incoming relay 920 is operated, each time that shunt relay 1100 operates it serves to connect a battery toll marking potential to the control conductor HS15. The toll marking circuit extends from battery through resistor R94, operated make contacts 923 on toll incoming relay 920, break contacts 1044 on unoperated relay 1040, operated make contacts 1102 on shunt relay 1100 to the HS15 conductor.

The incoming selector 120 in response to the first series of impulses received over the trunk line, which is assumed to be the digit "3," seizes connector circuit 132. The calling bridge relay 1330 in connector 132 operates in a circuit extending from ground through the upper winding of relay 1330 through the break portion 1311 of a make-before-break combination on relay 1310 to the tip conductor T16 and over the previously described loop circuit in trunk circuit 100, the ring conductor R16, the break portion 1313 of a make-before-break combination on relay 1310, and through the lower winding of relay 1330 to battery. Further series of impulses received from the operator's dial cause calling bridge relay 1330 to direct a suitable switch in connector 132 to seize the desired called line.

During each digit, battery is connected to the control conductor HS15 by the shunt relay 1100 in trunk circuit 100 as previously described. This toll marking potential serves to operate differentially connected toll relay 1300 in connector 132 to identify the call as a toll call. Operated contacts 1301 on toll relay 1300 may be used to control ringing circuits, busy verification circuits, or to cancel conversation timing in any well known manner.

At the completion of dialing the complete directory number of the called party, the operator restores her dial key to remove battery from the tip conductor T2 and ground from the ring conductor R2, respectively. In response to the restoration of the dial key, relays 310, 300 and 230 in trunk circuit 20 restore. The release of these relays serves no function at this time.

When the called party answers in response to a ringing signal transmitted over the line, the ringing is tripped and a loop is closed for the operation of the answer bridge relay 1310 in connector 132 over the tip and ring conductors T17 and R17, respectively, in the well known manner. At contacts 1311, 1312, 1313 and 1314, relay 1310 reverses battery over the tip and ring conductors T16 and R16, respectively. However, this battery reversal serves no function on a toll call. Also, at its operated make contacts 1315, relay 1310 closes battery through resistor R131 and through the lower winding of relay 1300, HS16 conductor, HS15 conductor, break contacts 1103 on unoperated relay 1100, operated make contacts 924 on relay 920, and through the lower winding of relay 1040 to ground. It might be well to mention at this time that the operation of the toll incoming relay 920, from the preliminary impulse, resulted in shorting the upper winding of relay 1040 by operated make contacts 921 on relay 920 and the connection of the lower winding of relay 1040 through operated contacts 924 of relay 920 to the HS conductor. Therefore, on a toll call, the supervisory relay 1040 is controlled over the HS conductor and is prevented from operating on reverse battery over the tip and ring conductors.

Operation of relay 1040 closes battery through resistance lamp L121, through its operated make contacts 1042, the M12 conductor, and over the previously described derived signal path to operate the polar duplex signal relay 900 in composite equipment 90. Operated relay 900 at its make contacts 901 closes ground to the E9 conductor through operated make contacts 733 of relay 730, and through the winding of supervisory relay 700 to battery. Relay 700 operates in this circuit and connects battery through resistor R71 and through its make contacts 706 to the HS8 conductor, incoming selector 64, conductor HS6, operated make contacts 428 of relay 420, the upper winding of differentially connected HS supervisory relay 410, operated make contacts 527 of relay 520 and through operated make contacts 429 of relay 420 to battery. The battery potential on either terminal of the upper winding of relay 410 shunts the upper winding of relay 410 so that it operates over its lower winding. At break contacts 414, relay 410 removes the operating ground for the coin tone relay 520. Relay 520 releases and removes the toll marking battery on make contacts 527 from the conductor HS6 and replaces it with ground through its break contacts 528.

The answer supervision is now repeated to the toll office by HS supervisory relay 410. Battery through resistance lamp L51 is connected through operated make contacts 413 on relay 410 to the conductor M4 and over the composite equipment to operate the polar duplex signal relay 330 in composite equipment 30. At operated make contacts 331, relay 330 closes a ground to the E2 conductor to operate supervisory relay 320 in trunk circuit 20.

At break contacts 323, relay 320, upon operating, removes the ground through the low resistance winding of sleeve relay 200 in series with supervisory lamp L22 at the operator's position. Thus, lamp L22 is extinguished to inform the operator that the call has been answered.

At completion of the conversation, the operator may initiate the release of the connection by withdrawing plug P21 from jack J21. Relays 200 and 210 in trunk circuit 20 release. At break contacts 213 on relay 210, ground is connected to conductor M2 to release polar duplex relay 340 in composite equipment 31. The release of relay 340 removes ground from conductor E4 at contacts 341 to release relay 430. At contacts 433, relay 430 opens the loop circuit to calling bridge relay 740 in trunk circuit 70 which releases. At contacts 742, relay 740 connects ground to conductor M9 to release polar duplex relay 910 in composite equipment 91. Relay 910 removes ground from conductor E12 at contacts 211 to release pulse-in relay 1020. At contacts 1023, relay 1020 opens the loop circuit to the calling bridge relay 1330 in connector 132 to initiate the release of the connector switch. When the delay relay in connector 132 releases, ground is removed from sleeve conductor S16 in the well known manner to release the switch-through relay in incoming selector 120 (not shown) and switch relay 1030 in trunk circuit 100.

In response to the release of relay 1030 and the removal of ground by the opening of contacts 1035, relays 1000 and 920 release. Release of relay 920 opens the operating circuit for relay 1040 which releases. Ground through break contacts 1112 on unoperated relay 1110 is now connected through break contacts 1043 on relay 1040 to the conductor M12 to release polar duplex relay 900 in composite equipment 90. Relay 900 removes ground from conductor E9 at contacts 901 to release supervisory relay 700 in trunk circuit 70.

Responsive to the opening of contacts 707 on relay 700, the holding circuit is opened for relay 720 which releases and in turn releases relay 730 by opening contacts 724. Ground is now removed from the sleeve conductor S8 to release the incoming selector 64 in Fig. 6 and the switch relay 420 in trunk circuit 40. Relay 410 releases and at contacts 412 connects ground to the M4 conductor to release the polar duplex relay 330 in composite equipment 30. Relay 330 opens contacts 331 to release relay 320 in trunk circuit 20. At contacts 332, relay 320 opens the holding circuit to release relay 220. The circuits are now restored to normal.

During the extension of a call, if all connectors, such as connector 132, in the third level of incoming selector 120 are busy, the incoming selector switch 120 will hunt to overflow and thereby close contacts 1232. Battery is then connected through resistor R125, 120 I. P. M. contacts 1233, operated overflow contacts 1232, the conductor HS15, and over the previously described circuit in trunk circuit 100 to flash supervisory relay 1040 at 120 I. P. M. The flashing is repeated by each of the relays which were controlled by answer supervision, namely, relays 900, 700, 410, 330, and 320. In accordance with the 120 I. P. M. flash of relay 320, ground through break contacts 323 is alternately connected and disconnected from the circuit through the low resistance winding of sleeve relay 200 to flash supervisory lamp L22 at 120 I. P. M.

If the called line is found busy by the connector switch, the busy test relay 1340 in the connector operates over the sleeve conductor S17 in the well known manner and connects ground through resistor R134, 60 I. P. M. contacts 1351, operated make contacts 1341 on relay 1340, and through the winding of the busy flash relay 1320 to battery. In accordance with the 60 I. P. M. pulses, relay 1320 alternately connects ground through resistor R132 and break contacts 1321 and battery through resistor R133 and operated make contacts 1322, break contacts 1316 of unoperated relay 1310, the lower winding of relay 1300, conductor HS16 and conductor HS15, to flash supervisory relay 1040 at 60 I. P. M. This flash is repeated in the same manner as the 120 I. P. M. flash is repeated to flash the supervisory lamp L22 at 60 I. P. M.

*Call from Sta. 1 in tandem office B to Sta. 2 in community dial office C*

Figure 6:
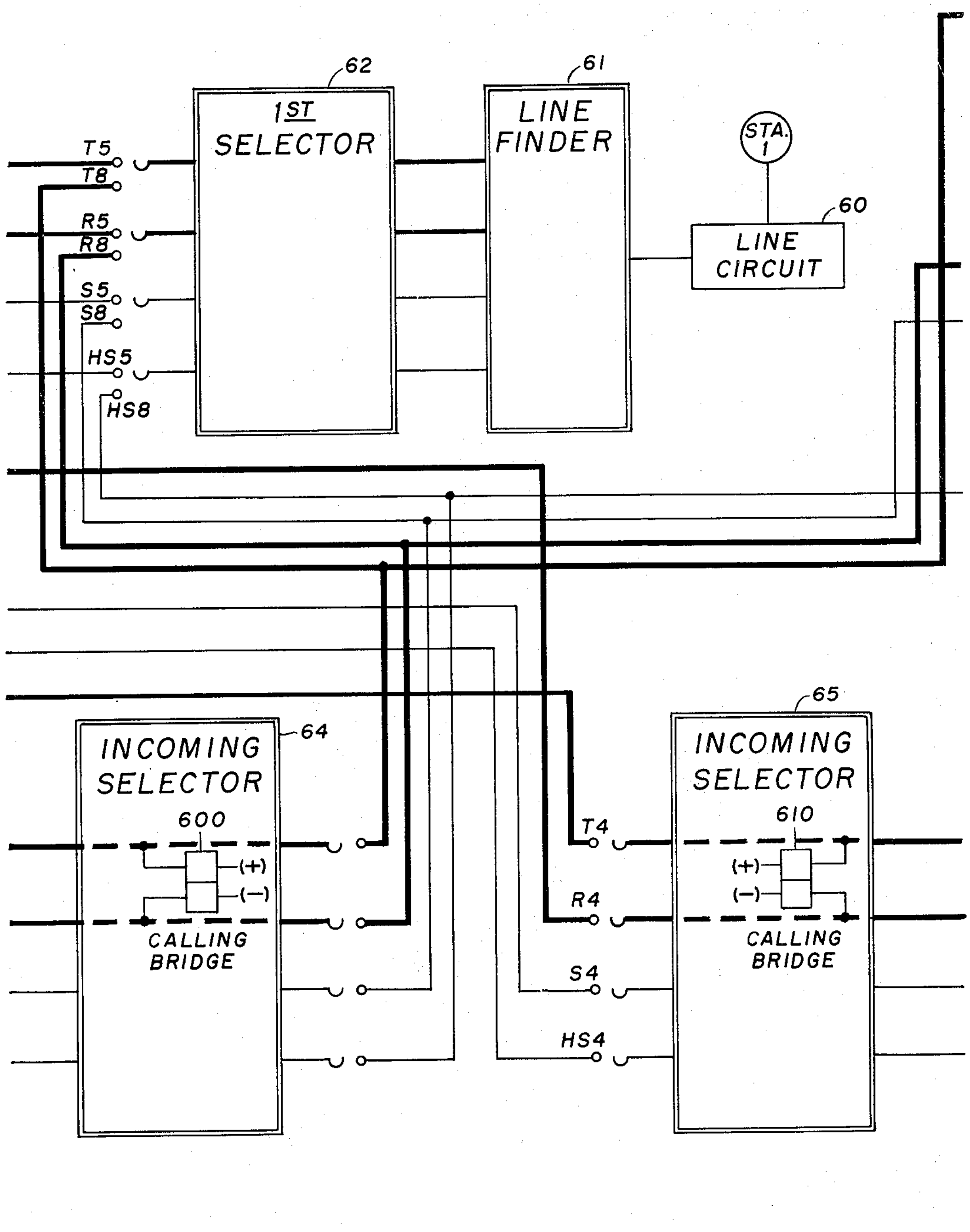
Fig. 6 shows switching circuits in a tandem office in block form.
Figure 7:
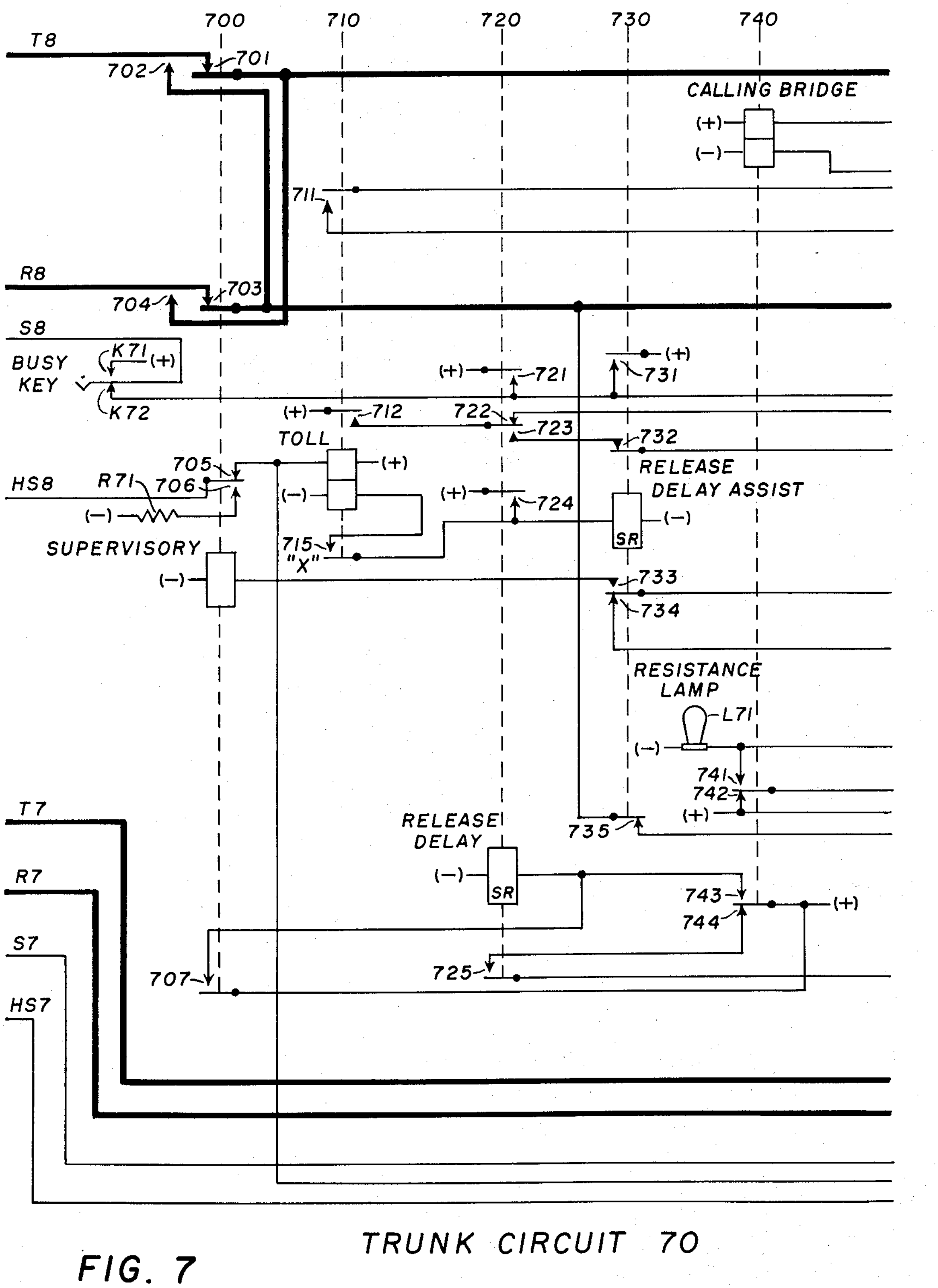
Figs. 7 and 8 show a two way trunk circuit in a tandem office which terminates a trunk line from a community dial office.
Figure 8:
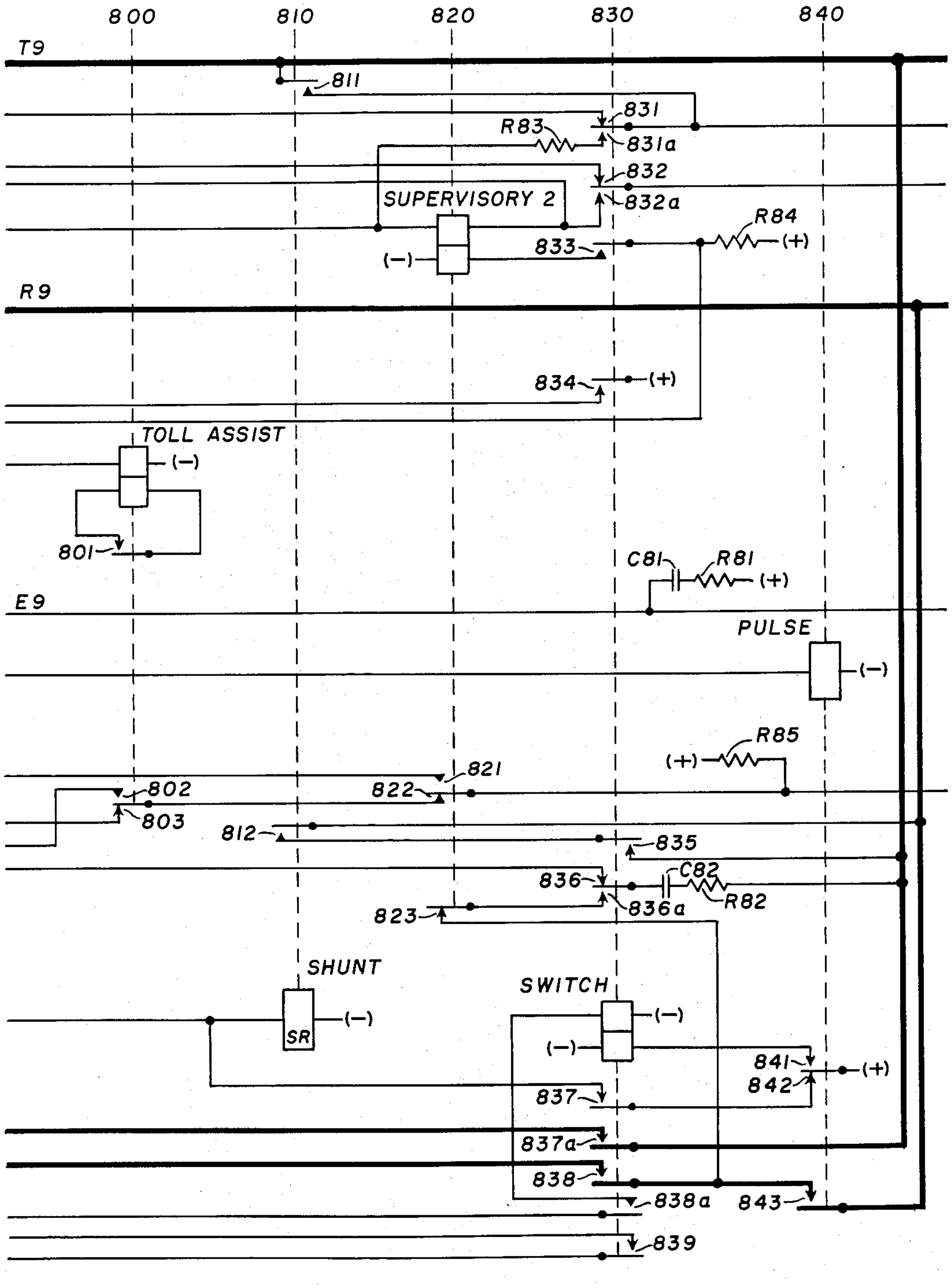
Figure 9:
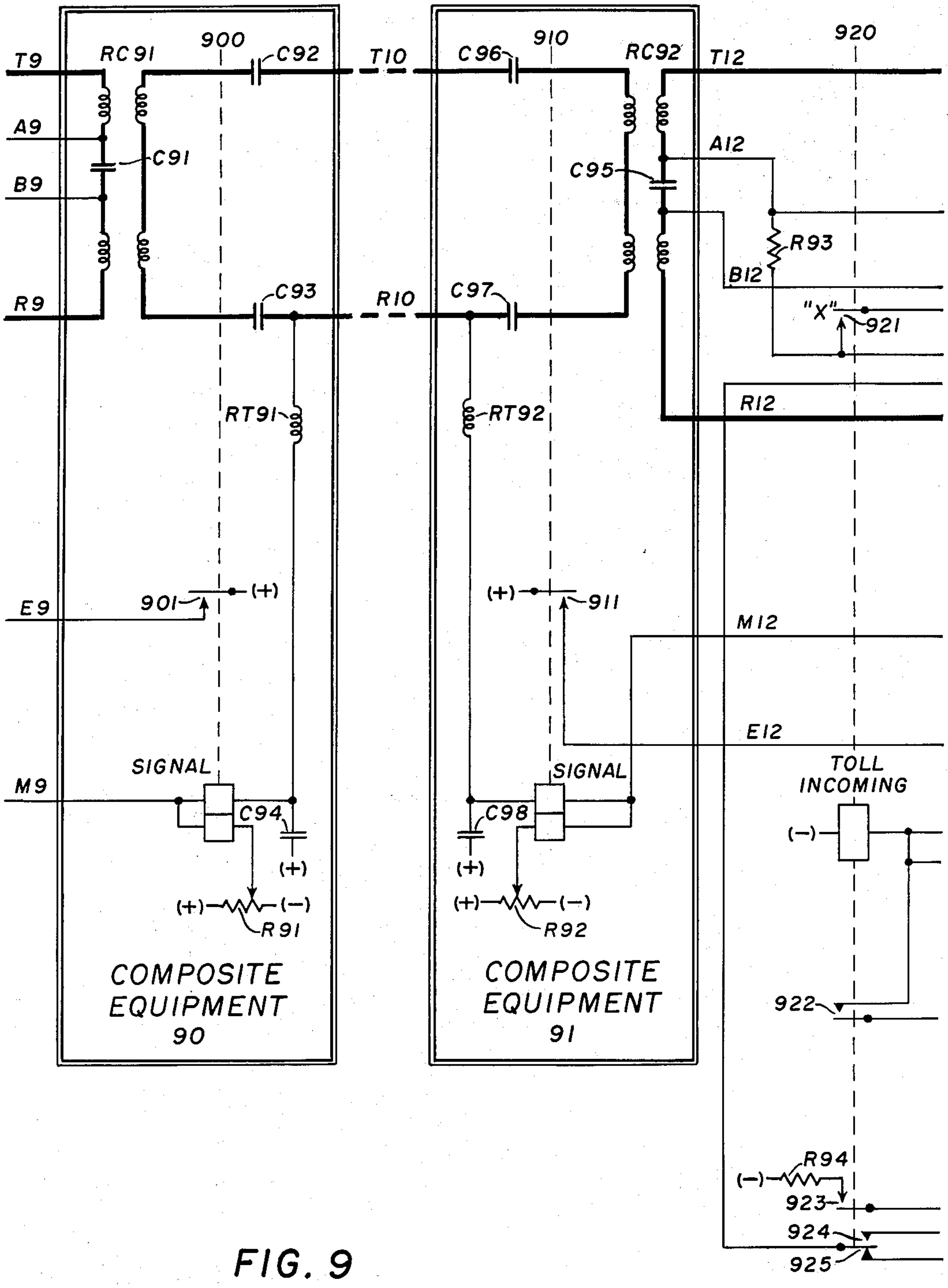
Figure 10:
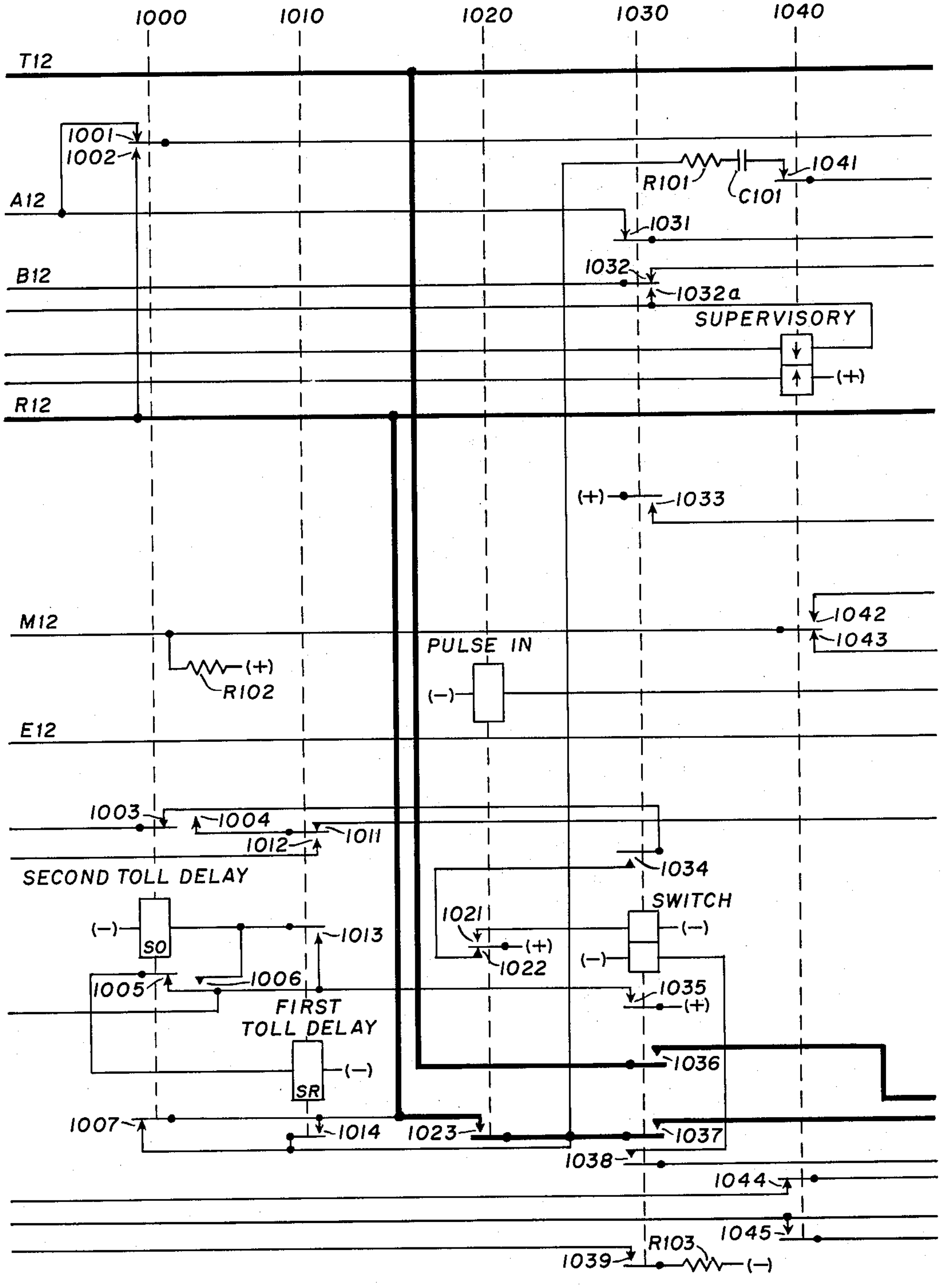
Figure 11:
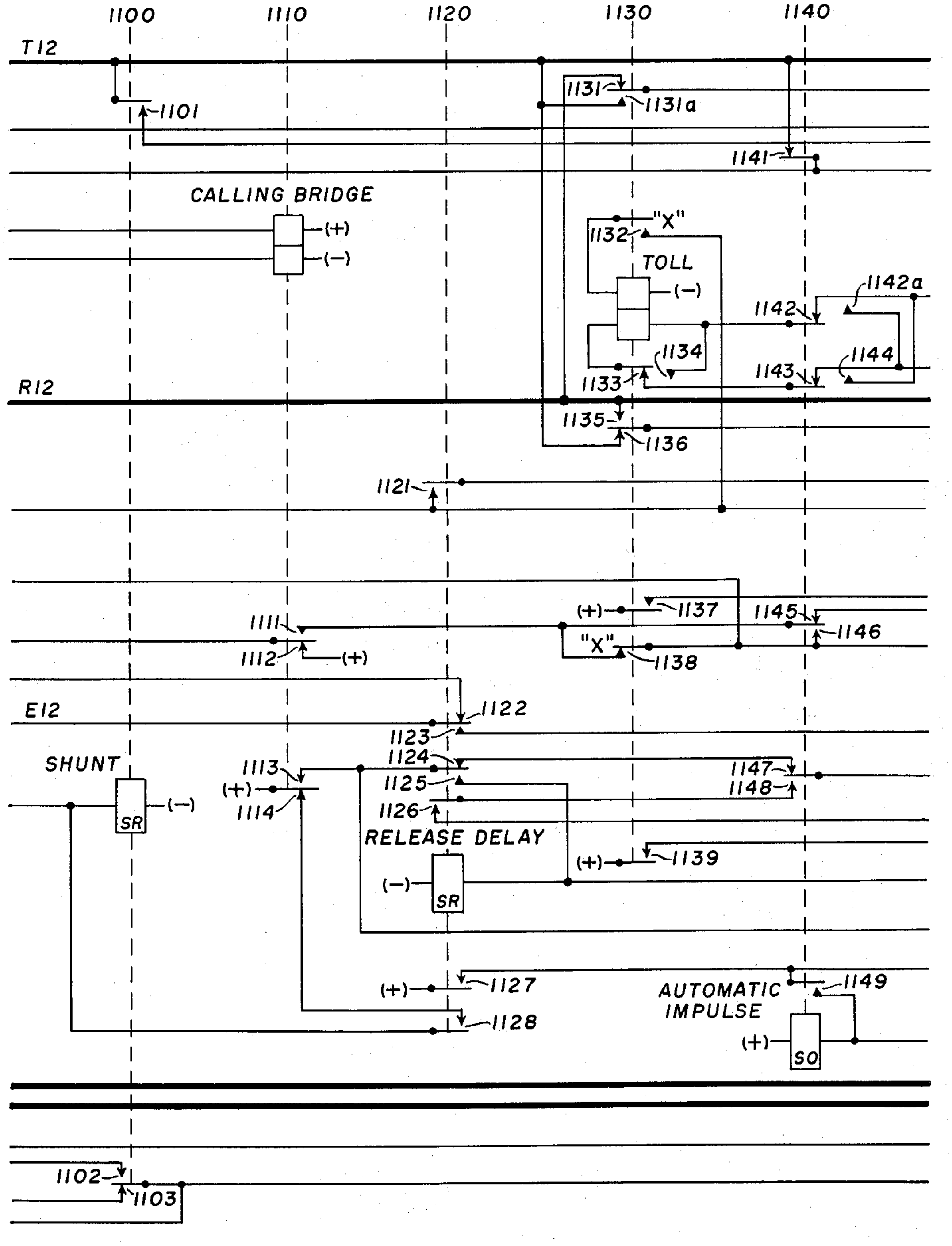

Referring to Fig. 6, when the subscriber at Sta. 1 lifts his receiver to initiate a call, line finder 61 functions to connect his line circuit 60 to first selector 62 in the well known manner. If it be assumed that the subscriber at Sta. 1 dials the digit "5", a suitable switch in first selector 62 hunts in the fifth level and connects to an idle trunk circuit, such as trunk circuit 70.

Calling bridge relay 740 in trunk circuit 70 operates in response to seizure over the tip and ring conductors T8 and R8, respectively, as previously described, and serves to connect battery through resistance lamp L71 to the M9 lead to operate polar duplex relay 910 in composite equipment 91 and pulse-in relay 1020 in trunk circuit 100, as previously described.

This call differs from the previously described call in that battery potential is not present on the control conductor HS8 when trunk circuit 70 is seized. Therefore, toll relay 710 and toll assist relay 800 do not operate to forward a preliminary impulse over the trunk line on local calls.

In trunk circuit 100, switch relay 1030 operates in response to the operation of relay 1020 and closes an operating ground at its make contacts 1035 for the timing device comprising relays 1010 and 1000. Relay 1010 operates and closes an operating circuit for relay 1000, as previously described. Relay 1000 then operates to release relay 1010. The release of relay 1010 marks the end of the timing interval so that toll incoming relay 920 cannot operate on subsequent dial impulses received over the trunk line.

Since relay 920 does not operate, battery is not forwarded on the HS15 conductor when shunt relay 1100 operates during each series of impulses. The toll marking path is open at unoperated make contacts 923 on relay 920. Also, it will be remembered that on a toll call the upper winding of supervisory relay 1040 was shunted by operated make contacts 921 on relay 920 and the lower winding of relay 1040 was connected through operated make contacts 924 to the HS15 conductor. Thus, on toll calls, supervisory relay 1040 is controlled over the HS conductor from subsequent circuits. Since relay 920 is not operated on a local call, the upper winding of supervisory relay 1040 is included in the loop circuit to the incoming selector 120 and to the connector 132. The lower bias winding of the supervisory relay 1040 is energized from battery through resistor R103, operated make contacts 1039 on relay 1030, break contacts 925 on relay 920, and through the winding to ground. Relay 1040 is differentially connected and will not operate until the battery is reversed on answer supervision in connector 132. Thus, on a local call, supervision is returned to the tandem office only when the call is answered. Flash busy, received over the HS15 conductor from succeeding circuits, is ineffective in this circuit because of the unoperated make contacts 924 on relay 920.

*Call from toll board 21 in toll office A to Sta. 1 in tandem office B*

A call extended from the toll board 21 to Sta. 1 is routed through trunk circuits 20 and 40, incoming selector 64, and connector 63 to line circuit 60, which is associated with Sta. 1. When the toll operator inserts plug P21 into jack J21, seizure of trunk circuits 20 and 40 and incoming selector 64 is identical to the operation described in a "Call From Toll Board 21 to Sta. 2." The operator then dials the digit "3" to cause a suitable switch in incoming selector 64 to seize an idle connector, such as connector 63, in the third level of the incoming selector.

Connector 63, which may be identical with connector 132, operates as a toll connector when seized by incoming selector 64 because of the battery potential placed on the HS6 conductor by coin tone relay 520 in trunk circuit 40, as previously described.

When the call is answered at Sta. 1, the connector functions to return a battery potential over the control conductor HS6. This battery potential operates HS supervisory relay 410 which releases relay 520 and repeats supervision over the M4 lead to the toll office, all as previously described.

Flash busy returned over the HS6 conductor will also be repeated by the HS supervisory relay 410 to the toll office, as previously described.

*Call from Sta. 2 in community dial office C to toll board 21 in toll office A*

Referring to Fig. 13, when a subscriber at Sta. 2 lifts his receiver, line finder 131 functions to connect the associated line circuit 130 with first selector 121 in a well known manner. If it be assumed that the subscriber at Sta. 2 wishes to place a call to toll board 21 in toll office A, he will dial the digit "0". A suitable switch in first selector 121 steps to level ten and hunts in that level for an idle trunk circuit such as trunk circuit 100.

Figure 12:
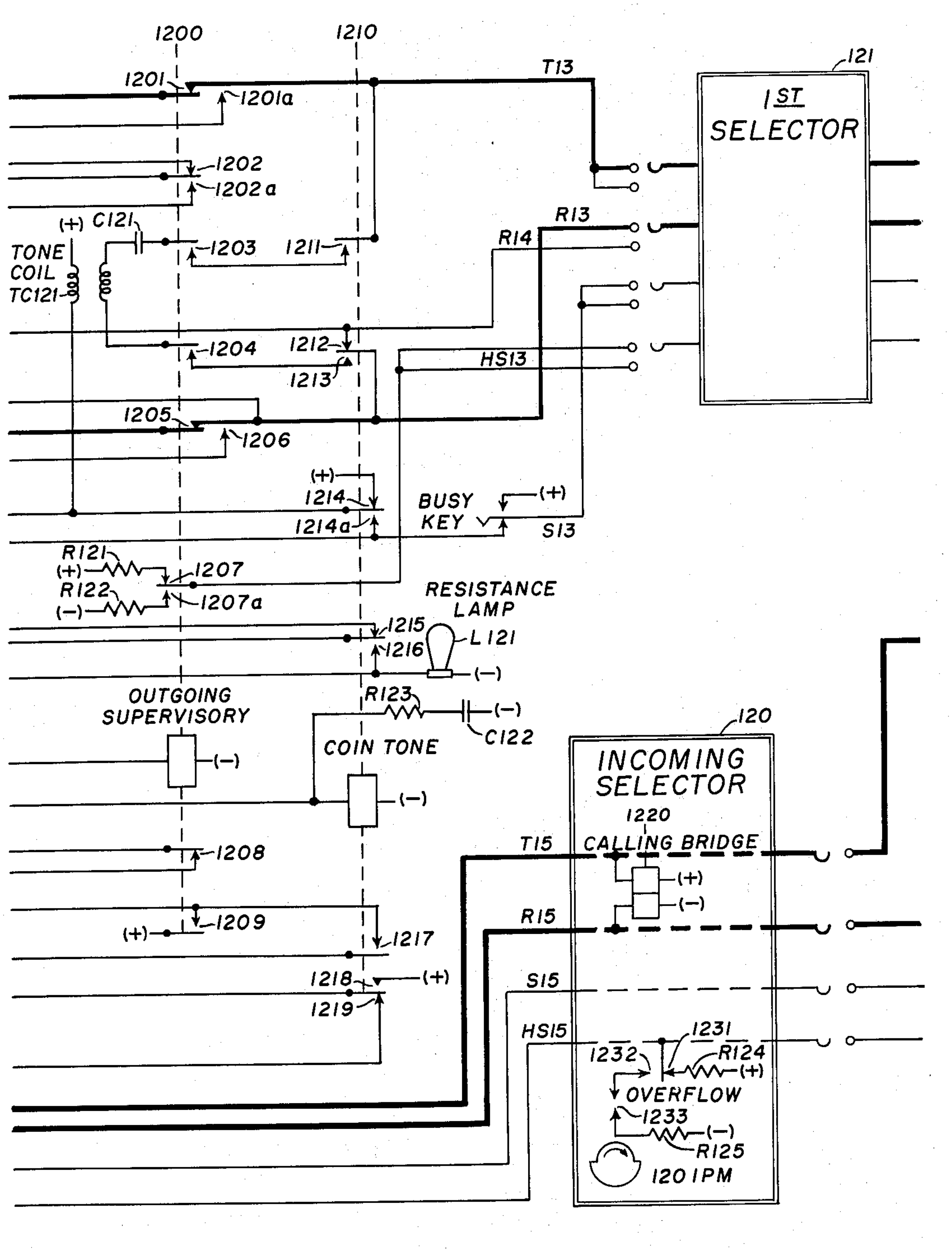

As shown in Fig. 12, trunk circuit 100 has two points of access outgoing from the community dial office C. The tip, sleeve and hunt sleeve conductors T13, S13 and HS13, respectively, are multipled to the two points of access. However, the ring conductors R13 and R14 are separate. If the trunk circuit 100 is seized over the access to toll which terminates in the tenth level of the banks of first selector 121, ring conductor R14 is used. Trunk circuit 100 is arranged to automatically send an impulse after seizure to cause the call to be extended through the tandem office to the toll office without further dialing on the part of the calling subscriber when seized over the access including ring conductor R14.

When first selector 121 switches through to trunk circuit 100, an operating circuit is completed for the calling bridge relay 1110. This operating circuit extends from ground through the upper winding of relay 1110, break contacts 1031 on unoperated relay 1030, conductor A12, upper right winding of repeat coil RC92, tip conductor T12, the break portion 1201 of a make-before-break combination on unoperated relay 1200, tip conductor T13 over the loop closed through the substation circuit, ring conductor R14, break contact 1212 on unoperated relay 1210, the break portion 1205 of a make-before-break combination on unoperated relay 1200, ring conductor R12, the lower right winding of repeat coil RC92, conductor B12, break contacts 1032 on unoperated relay 1030, and through the lower winding of relay 1110 to battery.

The operation of relay 1110 serves to connect battery through resistance lamp L121, break contacts 1138 on unoperated relay 1130, operated make contacts 1111 on relay 1110, break contacts 1043 on unoperated relay 1040 to the M12 conductor. As previously explained, the application of battery to the M12 conductor operates the polar duplex signal relay 900 in composite equipment 90. At its make contacts 901, the operated relay 900 closes ground to the E9 conductor through break contacts 734 on unoperated relay 730, and through the winding of pulse relay 840 to operate same. At make contacts 841, relay 840 closes an obvious operating circuit to the lower winding of switch relay 830.

A loop seizing circuit is now closed to the calling bridge relay 610 in incoming selector 65. The operating circuit for relay 610 extends from ground through the upper winding of relay 610, tip conductor T7, operated make contacts 837A on relay 830, tip conductor T9, the upper left winding of repeat coil RC91, conductor A9, operated make contacts 831A on relay 830, resistor R83, the upper winding of relay 820, operated make contacts 832A on relay 830, conductor B9, lower left winding of repeat coil RC91, ring conductor R9, operated make contacts 843 on relay 840, operated make contacts 838 on relay 830, ring conductor R7, and through the lower winding of relay 610 to battery. The operation of calling bridge relay 610 initiates the seizure of the control relays in the selector.

In trunk circuit 100 the operation of relay 1110 operates the coin tone relay 1210 over a circuit extending from ground on operated make contacts 1113 on relay 1110, break contacts 1124 on unoperated relay 1120, break contacts 1147 on unoperated relay 1140, and through the winding of relay 1210 to battery. The lower winding of toll relay 1130 is now unshunted by the operation of contacts 1212 on relay 1210. The series operating circuit for relay 1130 extends from ring conductor R14 through the break portion 1142 of a make-before-break combination on relay 1140, the lower winding of relay 1130, break portion 1133 of a make-before-break combination on relay 1130, the break portion 1143 of a make-before-break combination on unoperated relay 1140 to the R13 conductor. Thus the lower winding of toll relay 1130 is now inserted in series with the loop circuit extending from the calling subscriber's substation to the calling bridge relay 1110 to operate said relay.

Release delay relay 1120 operates in a circuit extending from ground on operated make contacts 1113 on relay 1110 through operated make contacts 1217 on relay 1210, and through its winding to battery. Responsive to the operation of relay 1120 the energizing circuit for relay 1210 is opened at break contacts 1124. Relay 1210 is slow-release because of the connection of a large capacitor C122 in parallel with its winding. When relay 1210 finally releases, an operating circuit is completed for the automatic impulse relay 1140. This circuit extends from ground on operated make contacts 1127 on relay 1120, through break contacts 1219, on unoperated relay 1210, and through the winding of relay 1140 to battery. At contacts 1149, relay 1140 closes a holding circuit for itself independent of the break contacts 1219.

An automatic impulse is transmitted over the M12 conductor during the operate time of the automatic impulse relay 1140. When relay 1210 releases and before relay 1140 operates, ground on operated make contacts 1137 of toll relay 1130 is connected through break contacts 1215 of unoperated relay 1210, break contacts 1145 of still unoperated relay 1140, operated make contacts 1111 of relay 1110 to the M12 conductor. When relay 1140 operates, the automatic impulse is terminated by the transfer of the M12 lead from ground on break contacts 1145 of relay 1140 to battery on make contacts 1146 on relay 1140. Break contacts 1138 on the toll relay 1130 were opened upon the operation of relay 1130 to unshunt and make effective the automatic impulse portion of the M12 conductor.

Responsive to the operation of relay 1140, a second operating circuit for coin tone relay 1210 is completed. The circuit extends from ground on operated make contacts 1139 of relay 1130, through break contacts 1208 on unoperated relay 1200, operated make contacts 1126 on relay 1120, operated make contacts 1148 on relay 1140, and through the winding of relay 1210 to battery. A further result of the operation of relay 1140 is the connection of ring conductor R14 to ring conductor R13 through operated make contacts 1142A and 1144 on relay 1140. This operation effectively removes the operating winding of toll relay 1130 from the loop circuit so that the line will be balanced during conversation. Relay 1130 had previously locked itself operated through its preliminary make contacts 1132 and through the operated make contacts 1121 on relay 1120 to ground through the left winding of tone coil TC121.

In response to the automatic impulse transmitted over the derived signal conductor, relay 900 releases to remove ground from the E9 conductor which releases pulse relay 840 in trunk circuit 70.

At contacts 843, pulse relay 840 repeats the automatic impulse to calling bridge relay 610 of incoming selector 65. A suitable switch in incoming selector 65 is thereby caused to step to the first level of bank contacts and hunt in the first level for an idle trunk circuit, such as trunk circuit 40, extending to the toll office A. The non-reverse battery access of trunk circuit 40 comprising tip, ring, sleeve and control conductors T4, R4, S4, and HS4, respectively, terminates in the first level of bank contacts of incoming selector 65.

In trunk circuit 40, calling bridge relay 500 operates in response to seizure over the above-mentioned conductors. The operating circuit for relay 500 extends from ground through the upper winding of relay 500, break contacts 422 on unoperated relay 420, conductor A4, the upper right winding of repeat coil RC32, tip conductor T4, over the previously described loop circuit in trunk circuit 70, ring conductor R4, the lower right winding of repeat coil RC32, conductor B4, break contacts 423 on unoperated relay 420, and through the lower winding of relay 500 to battery.

Responsive to the operation of calling bridge relay 500, battery is closed to the M4 conductor to seize trunk circuit 20 in toll office A. The circuit extends from battery through resistance lamp L51, operated make contacts 502 on relay 500, and break contacts 412 on unoperated relay 410 to the M4 conductor. Polar duplex signal relay 330 in composite equipment 30 operates in response to this battery connection and at its make contact 331 closes an obvious operating circuit for supervisory relay 320 in trunk circuit 20.

Returning to trunk circuit 40, it can be seen that the operation of relay 500 also closes an operating circuit through its make contacts 504 to the release delay relay 440.

Coin tone relay 520 operates in a circuit extending from ground on operated make contacts 446 on relay 440, and through break contacts 519A on unoperated relay 510.

In trunk circuit 20, operated relay 320 closes battery through its make contacts 321, through break contacts 221 on unoperated relay 220 to illuminate the ground connected incoming lamp L21 which is associated with trunk circuit 20 at the toll board 21.

In response to the illumination of incoming lamp L21, the toll operator inserts plug P21 into jack J21 to answer the call. Sleeve relay 200 operates in a circuit extending from ground through its upper high resistance winding, sleeve conductor S2, and through the supervisory lamp L22 to battery. As previously mentioned, lamp L22 does not light in this high resistance circuit. At operated make contacts 201, relay 200 closes an operating circuit for sleeve slave relay 210. At operated make contacts 211, relay 210 closes an operating circuit to the supervisory 1 relay 220. At break contacts 221, relay 220 opens the energizing circuit for the incoming lamp L21.

Answering supervision is returned over the M lead to trunk circuit 40 responsive to the operation of relay 210. The answering supervision comprises battery through resistance lamp L23, break contacts 232 on relay 230 or break contacts 314 on relay 310, operated make contacts 212 on relay 210 to the M2 conductor. This battery potential operates the polar duplex signal relay 340 in composite equipment 31. At its make contacts 341, relay 340 connects ground to the E4 conductor, through operated make contacts 443 on relay 440 and through the winding of the supervisory relay 510 to battery. Relay 510 operates in this circuit. Ring-back tone which had been applied to the calling trunk line through break contacts 401 on unoperated relay 400, operated make contacts 447 on relay 440, break contacts 514 on unoperated relay 510, operated make contacts 523 on relay 520 to the R4 conductor is now removed by the operation of contacts 514 on relay 510. Coin tone relay 520 is also released responsive to the operation of break contacts 519A on relay 510. An operating circuit is now closed for the shunt relay 400. This circuit extends from ground through operated make contacts 446 on relay 440, operated make contacts 519 on relay 510, break contacts 526 on unoperated relay 520, operated make contacts 444 on relay 440, resistor R44, and through the winding of relay 400 to battery. Relay 400 serves no function at this time other than to further open the ring-back tone circuit at its break contacts 401.

Also responsive to the operation of supervisory relay 510, battery through resistor R54 and operated make contacts 517A on relay 510 is connected to the HS4 conductor through incoming selector 65, conductor HS7, operated make contacts 839 on relay 830, and through the upper winding of toll relay 710 in trunk circuit 70. Toll relay 710 operates in this circuit and closes an operating circuit to the supervisory 2 relay 820. This operating circuit extends from ground on operated make contacts 712 on relay 710 through break contacts 722 on unoperated relay 720, operated make contacts 833 on relay 830, and through the lower winding of relay 820 to battery. The primary winding of the supervisory 2 relay 820, which was included in the loop circuit extended to the incoming selector 65, is now shunted by operated make contacts 711 on relay 710. The supervisory 2 relay would be controlled by reverse battery supervision when incoming selector 65 extends a call to circuits which do not include the fourth or HS conductor.

At its operated make contacts 821, relay 820 connects battery through resistance lamp L71 to the M9 conductor to operate polar duplex signal relay 910 in composite equipment 91. At its operated make contacts 911, relay 910 connects ground to the E12 conductor through operated make contacts 1123 on relay 1120 and through the winding of the outgoing supervisory relay 1200 to battery. Relay 1200 operates and at contacts 1201, 1201A, 1205 and 1206 reverses the connection of the T13 and R13 conductors. However, since contacts 1131A and 1135 are operated on relay 1130, the battery to the calling equipment is not reversed. This cancellation of reverse battery supervision on a call to toll enables the calling party at a paystation to make a call to a toll operator without charge.

If the calling line is a paystation line, paystation tone coupled to the sleeve conductor at the line circuit in the well known manner will be present in the left winding of tone coil TC121. This paystation tone is inductively coupled to the right-hand winding of tone coil TC121 and is momentarily connected to the trunk line when answer supervision is received. The circuit extends from the tip conductor T13 through operated make contacts 1211 on relay 1210, operated make contacts 1203 on relay 1200, capacitor C121, the right winding of tone coil TC121, operated make contacts 1204 on relay 1200, and operated make contacts 1213 on relay 1210 to the ring conductor R13. The energizing circuit for the slow-release coin tone relay 1210 is opened at break contacts 1208 on relay 1200. Thus, coin tone is connected to the trunk line for the release time of the coin tone relay 1210.

If the operator wishes to recheck the coin tone, she momentarily withdraws plug P21 from jack J21. Relays 200 and 210 in trunk circuit 20 release and transfer the M2 conductor to ground to release relay 340 which in turn releases relay 510 in trunk circuit 40. In trunk circuit 40, relay 520 reoperates from ground through break contacts 519A of relay 510. Ring-back tone is not reconnected to the trunk line since shunt relay 400 is locked operated and maintains the disconnection at its break contacts 401.

Responsive to the release of relay 510, relays 710 and 820 in trunk circuit 70 release to place ground on the M9 conductor to the community dial office. Relays 910 and 1200 release and coin tone relay 1210 reoperates through break contacts 1208 on release relay 1200. When the operator again inserts plug P21 into jack J21, all supervisory relays operate in the manner as described when the call was originally answered. Coin box tone is reapplied to the trunk line in trunk circuit 100 for the release time of coin tone relay 1210.

When the calling party releases at the termination of the conversation, or when he desire to recall the operator by flashing of his hook-switch, calling bridge relay 1110 releases to place ground on the M12 conductor. In response to this ground potential, relays 900, 840 and 500 release. The release of relay 500 connects the M4 lead to ground to release relays 330 and 320 in toll office A. At break contacts 323, relay 320 closes ground through the low resistance winding of sleeve relay 200 to illuminate the supervisory lamp L22 in the cord circuit.

In response to a steady supervisory signal, the operator will withdraw plug P21 from jack J21 to release the connection. In trunk circuit 20, relays 200, 210 and 220 release in turn responsive to the disconnection. The M2 conductor is returned to ground at break contacts 213 on relay 210 to release relays 340, 510 and 440 in the tandem office. In trunk circuit 70, relays 710, 820 and 830 release and connect the M9 conductor to ground at break contacts 822 on relay 820 to release relays 910, 1200 and 1120 in the community dial office. When relay 1120 releases, it removes ground from the S13 conductor at its contacts 1121 to release the first selector 121 and the line finder 131. All of the circuits are now restored to their normal condition.

*Call from Sta. 2 in community dial office C to Sta. 1 in tandem office B*

When the subscriber at Sta. 2 wishes to call a subscriber in tandem office B, he dials the digit "5" so that the first selector 121 seizes trunk circuit 100 over the non-impulse sending level. In trunk circuit 100, relays 1110, 1210 and 1120 operate on seizure as previously described. Relay 1210 releases upon operation of relay 1120. Automatic impulse sending relay 1140 operates as before but an automatic impulse is not transmitted over the M conductor since break contacts 1138 on unoperated relay 1130 maintain battery on the M12 conductor. Relay 1210 does not reoperate after the operation of relay 1140 since toll relay 1130 is not operated. The subscriber dials the remaining digits of the calling susbcriber's number into incoming selector 65 and connector 63 in the tandem office to seize the called line.

Answer supervision returned to trunk circuit 100 is the same as previously described. However, the operation in trunk circuit 100 is slightly different than before since toll relay 1130 is not operated. When outgoing supervisory relay 1200 operates in response to ground received over the E12 conductor, as previously described, battery is reversed over the calling T13 and R13 conductors by operated contacts 1201, 1201A, 1205 and 1206 on relay 1200. This battery reversal serves to cause the preceding circuits to automatically collect a coin if the call is from a paystation. Coin box tone is not connected to the trunk line since coin tone relay 1210 is not operated.

The release of the circuits at the termination of the conversation is the same as previously described.

*Call from Sta. 1 in tandem office B to toll board 21 in toll office A*

Subscribers in tandem office B dial the digit "0" to extend a call to the toll board 21 in toll office A. The reverse battery access tip, ring, sleeve and control conductors T5, R5, S5 and HS5, respectively, of trunk circuit 40, terminate in the tenth level of first selector 62. In response to seizure by first selector 62, relays 500, 440 and 520 in trunk circuit 40 operate as previously described when the trunk circuit was seized from incoming selector 65. In toll office A, relays 330 and 320 operate to illuminate the incoming lamp L21 associated with the trunk circuit 20 at the toll board. When the operator answers the call in response to the illumination of the incoming lamp L21, relays 200, 210 and 220 operate as previously described and connect ground to the M2 conductor to operate relays 340, 510 and 400 in trunk circuit 40. Relay 400 disconnects the ring-back tone as previously described at its break contacts 401. Coin box tone, if present on the S5 conductor, is coupled through the trunk line conductors for the release time of the coin tone relay 520.

The operator may recheck the coin tone and release the connection in the same manner as previously described.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a telephone system, a first trunk circuit and a second trunk circuit, a trunk line interconnecting said trunk circuits and comprising a communication channel and a derived signal path, first and second classes of calling lines, switching equipment, means for extending a connection from either said first or said second classes of calling lines to said first trunk circuit, means in said first trunk circuit for repeating switch directing impulses from either said first or said second classes of calling lines to said second trunk circuit over said derived signal path, means in said second trunk circuit for repeating the switch directing impulses received over the derived signal path to said switching equipment, means in said first trunk circuit operative only in the event that a connection is extended thereto from said first class of calling line for transmitting a preliminary impulse over said derived signal path to the second trunk circuit, and means in said second trunk circuit responsive to the receipt of the preliminary impulse for identifying the class of the calling line to the switching equipment.

2. In a telephone system, a first trunk circuit and a second trunk circuit, a trunk line interconnecting said trunk circuits and comprising a communication channel and a derived signal path, a calling operator position, a calling line, switching equipment, means for extending a connection from either said calling operator position or said calling line to said first trunk circuit, means in said first trunk circuit for repeating switch directing impulses from either said calling operator position or said calling line to said second trunk circuit over said derived signal path, means in said second trunk circuit for repeating the switch directing impulses received over the derived signal path to said switching equipment, means in said first trunk circuit operative only in the event that a connection is extended thereto from said calling operator position for transmitting a preliminary impulse over said derived signal path to the second trunk circuit, and means in said second trunk circuit responsive to the receipt of the preliminary impulse for identifying the extended call as a toll call to the switching equipment.

3. In a telephone system, a first trunk circuit and a second trunk circuit, a trunk line interconnecting said trunk circuits and comprising a communication channel and a derived signal path, first and second classes of calling lines, switching equipment, means for extending a connection from either said first or said second classes of calling lines to said first trunk circuit, means in said first trunk circuit for repeating switch directing impulses from either said first or said second classes of calling lines to said second trunk circuit over said derived signal path, means in said second trunk circuit for repeating the switch directing impulses received over the derived signal path to said switching equipment, means in said first trunk circuit operative only in the event that a connection is extended thereto from said first class of calling line for transmitting a preliminary impulse over said derived signal path to the second trunk circuit, means in said second trunk circuit for preventing the repeating of the preliminary impulse to the switching equipment, and means in said second trunk circuit responsive to the receipt of the preliminary impulse for identifying the class of the calling line to the switching equipment.

4. In a telephone system, a first trunk circuit and a second trunk circuit, a trunk line interconnecting said trunk circuits and comprising a communication channel and a derived signal path, a calling operator position, a calling line, switching equipment, means for extending a connection from either said calling operator position or said calling line to said first trunk circuit, means in said first trunk circuit for repeating switch directing impulses from either said calling operator position or said calling line to said second trunk circuit over said derived signal path, means in said second trunk circuit for repeating the switch directing impulses received over the derived signal path to said switching equipment, means in said first trunk circuit operative only in the event that a connection is extended thereto from said calling operator position for transmitting a preliminary impulse over said derived signal path to the second trunk circuit, means in said second trunk circuit for preventing the repeating of the preliminary impulse to the switching equipment, and means in said second trunk circuit responsive to the receipt of the preliminary impulse for identifying the extended call as a toll call to the switching equipment.

5. In a telephone system, a first trunk circuit and a second trunk circuit, a trunk line interconnecting said trunk circuits and comprising a communication channel and a derived signal path, first and second classes of calling lines, means for extending a connection from either said first or said second classes of calling lines to said first trunk circuit, means in said first trunk circuit for repeating switch directing impulses from either said first or said second classes of calling lines to said second trunk circuit over said derived signal path, switching equipment associated with said second trunk circuit, said switching equipment including line conductors and a control conductor, means in said second trunk circuit for repeating the switch directing impulses received over the derived signal path to said switching equipment over the line conductors, means in said first trunk circuit operative only in the event that a connection is extended thereto from said first class of calling line for transmitting a preliminary impulse over said derived signal path to the second trunk circuit, a source of marking potential, and means in said second trunk circuit responsive to the receipt of the preliminary impulse for connecting said source of marking potential to said control conductor.

6. In a telephone system, a first trunk circuit and a second trunk circuit, a trunk line interconnecting said trunk circuits and comprising a communication channel and a derived signal path, first and second classes of calling lines, means for extending a connection from either said first or said second classes of calling lines to said first trunk circuit, means in said first trunk circuit for repeating switch directing impulses from either said first or said second classes of calling lines to said second trunk circuit over said derived signal path, switching equipment associated with said second trunk circuit, said switching equipment including line conductors and a control conductor, means in said second trunk circuit for repeating the switch directing impulses received over the derived signal path to said switching equipment over the line conductors, means in said first trunk circuit operative only in the event that a connection is extended thereto from said first class of calling line for transmitting a preliminary impulse over said derived signal path to the second trunk circuit, a source of marking potential, means in said second trunk circuit for preventing the repeating of the preliminary impulse to the switching equipment line conductors, and means in said second trunk circuit responsive to the receipt of the preliminary impulse for connecting said source of marking potential to said control conductor.

7. In a telephone system, a first trunk circuit and a second trunk circuit, a trunk line interconnecting said trunk circuits and comprising a communication channel and a derived signal path, first and second classes of calling lines, means for extending a connection from either said first or said second classes of calling lines to said first trunk circuit, line conductors and a control conductor included in said connection, a first marking potential connected to said control conductor on connections extended from said first class of calling lines, means in said first trunk circuit for repeating switch directing impulses received over said line conductors from either said first or said second classes of calling lines to said second trunk circuit over said derived signal path, switching equipment associated with said second trunk circuit, second line conductors and a second control conductor included in said switching equipment, means in said second trunk circuit for repeating the switch directing impulses received over the derived signal path to said switching equipment over the second line conductors, means in said first trunk circuit operated in response to said first marking potential for transmitting a preliminary impulse over said derived signal path to the second trunk circuit, a second marking potential, and means in said second trunk circuit responsive to the receipt of the preliminary impulse for connecting said second marking potential to said second control conductor.

8. In a telephone system, a first trunk circuit and a second trunk circuit, a trunk line interconnecting said trunk circuits and comprising a communication channel and a derived signal path, first and second classes of calling lines, means for extending a connection from either said first or said second classes of calling lines to said first trunk circuit, line conductors and a control conductor included in said connection, a first marking potential connected to said control conductor on connections extended from said first class calling lines, means in said first trunk circuit for repeating switch directing impulses received over said line conductors from either said first or said second classes of calling lines to said second trunk circuit over said derived signal path, switching equipment associated with said second trunk circuit, second line conductors and a second control conductor included in said switching equipment, means in said second trunk circuit for repeating the switch directing impulses received over the derived signal path to said switching equipment over the second line conductors, means in said first trunk circuit operated in response to said first marking potential for transmitting a preliminary impulse over said derived signal path to the second trunk circuit, a second marking potential, means in said second trunk circuit for preventing the repeating of the preliminary impulse to said switching equipment over the second line conductors, and means in said second trunk circuit responsive to the receipt of the preliminary impulse for connecting said second marking potential to said second control conductor.

9. In a telephone system, a first trunk circuit and a second trunk circuit, a trunk line interconnecting said trunk circuits, said trunk line comprising a communication channel and a derived signal path, switching equipment connected to said second trunk circuit, line conductors and a control conductor included in said switching equipment, means for extending a connection to said first trunk circuit, means in said first trunk circuit responsive to the extension of a connection thereto for setting up a current flow over said derived signal path, a timing device in said second trunk circuit, means responsive to the current flow over the derived signal path for initiating a timing cycle of said timing device, said timing device having a timing cycle which is completed before the transmittal of switch directing impulses, means also responsive to the current flow over the derived signal path for seizing said switching equipment over said line conductors, means in said first trunk circuit for producing series of interruptions in said current flow to transmit switch directing impulses to said second trunk circuit, means in said second trunk circuit responsive to said series of interruptions in said current flow to repeat switch directing impulses to said switching equipment over said line conductors, means in said first trunk circuit for transmitting other information to said second trunk circuit by automatically interrupting said current flow to transmit a preliminary impulse, said last named means being arranged to transmit said preliminary impulse before the completion of the timing cycle of said timing device, a relay in said second trunk circuit operated in response to the receipt of the preliminary impulse, a source of marking potential, and means responsive to the operation of said relay for connecting said source of marking potential to said control conductor.

10. In a telephone system, a first trunk circuit and a second trunk circuit, a trunk line interconnecting said trunk circuits, said trunk line comprising a communication channel and a derived signal path, switching equipment connected to said second trunk circuit, line conductors and a control conductor included in said switching equipment, means for extending a connection to said first trunk circuit, means in said first trunk circuit responsive to the extension of a connection thereto for setting up a current flow over said derived signal path, a timing device in said second trunk circuit, means responsive to the current flow over the derived signal path for initiating a timing cycle of said timing device, said timing device having a timing cycle which is completed before the transmittal of switch directing impulses, means also responsive to the current flow over the derived signal path for seizing said switching equipment over said line conductors, first contacts in said first trunk circuit for producing series of interruptions in said current flow to transmit switch directing impulses to said second trunk circuit, second contacts in said second trunk circuit responsive to said series of interruptions in said current flow to repeat switch directing impulses to said switching equipment over said line conductors, means in said first trunk circuit for transmitting other information to said second trunk circuit by automatically interrupting said current flow to transmit a preliminary impulse, said last named means being arranged to transmit said preliminary impulse before the completion of the timing cycle of said timing device, means effective during the timing cycle of said timing device for shunting said second contacts so that the preliminary impulse is not repeated to the switching equipment, a relay in said second trunk circuit operated in response to the receipt of the preliminary impulse, a source of marking potential, and means responsive to the operation of said relay for connecting said source of marking potential to said control conductor.

11. In a telephone system, a trunk circuit, a trunk line connected to said trunk circuit, switching equipment, means for extending a connection over said trunk line to said trunk circuit, a pulsing relay in said trunk circuit operated in response to the extension of a connection over said trunk line to said trunk circuit, a timing device, means responsive to the operation of said pulsing relay for initiating a timing cycle of said timing device a seizing circuit for said switching equipment including contacts of said pulsing relay, means also responsive to the operation of said pulsing relay for completing the seizing circuit for said switching equipment, means for transmitting impulses over said trunk line to release and operate said pulsing relay, and means effective during the timing cycle of said timing device for shunting said contacts of said pulsing relay so that impulses transmitted over the trunk line during the timing cycle are not repeated to the switching equipment.

12. In a telephone system, a trunk circuit, a trunk line connected to said trunk circuit, switching equipment, line conductors and a control conductor extending from said trunk circuit to said switching equipment, means for extending a connection over said trunk line to said trunk circuit, a pulsing relay in said trunk circuit operated in response to the extension of a connection over said trunk line to said trunk circuit, a timing device, means responsive to the operation of said pulsing relay for initiating a timing cycle of said timing device, a seizing circuit for said switching equipment including said line conductors and make contacts of said pulsing relay, means also responsive to the operation of said pulsing relay for completing said seizing circuit for said switching equipment, a relay in said trunk circuit, an operating circuit for said relay including break contacts on said pulsing relay, means for transmitting impulses over said trunk line to said trunk circuit to release and operate said pulsing relay, means effective during the timing cycle of said timing device for shunting said make contacts of said pulsing relay and for completing the operating circuit from said break contacts to said relay so that an impulse transmitted over the trunk line which releases said pulsing relay during the timing cycle of said timing device will not be repeated to the switching equipment but will be effective to operate said relay, a marking potential, and means responsive to the operation of said relay for connecting said marking potential to said control conductor.

13. In a telephone system, a toll office, a tandem office, and a distant office, a first trunk line extending from said toll office to said tandem office, a second trunk line extending from said tandem office to said distant office, an operator position in said toll office, a first trunk circuit in said tandem office terminating said first trunk line, a second trunk circuit in said tandem office terminating said second trunk line, switching equipment connected to said first trunk circuit and having access to said second trunk circuit, a called line in said distant office, means for extending a connection from said operator position over said first trunk line to said first trunk circuit, a control conductor extending between said first trunk circuit and said switching equipment, a corresponding control conductor in said second trunk circuit, means in said first trunk circuit responsive to a first series of impulses received over said first trunk line for repeating the series of impulses to the switching equipment to direct said switching equipment to seize said second trunk circuit and thereby connect said control conductor with the corresponding control conductor in the second trunk circuit, a toll marking potential, means in said first trunk circuit also responsive to the first series of impulses received over said first trunk line for connecting said toll marking potential to said control conductor, means in said second trunk circuit responsive to seizure by said switching equipment for extending the connection over said second trunk line to the distant office, toll marking means in said second trunk circuit operated in response to said toll marking potential, means responsive to the operation of said toll marking means for identifying the extended connection as a toll call in the distant office, means under control of the operator position for further extending the connection in the distant office to seize the called line, an answering supervisory potential, means in said second trunk circuit responsive to an answering operation at the called line for connecting said answering supervisory potential to said control conductor, and means in said first trunk circuit responsive to said answering supervisory potential for disconnecting said marking potential from said control conductor.

14. In a telephone system, a first trunk circuit and a second trunk circuit, a trunk line interconnecting said first and second trunk circuits, an operator position, a called line, switching equipment connected to said second trunk circuit, a control conductor extending between said second trunk circuit and said switching equipment, means for extending a connection from said operator position to said first trunk circuit, means in said first trunk circuit responsive to the extension of a connection thereto for seizing said second trunk circuit over said trunk line, means in said second trunk circuit responsive to seizure over said trunk line for seizing said switching equipment, a toll marking potential, means in said second trunk circuit responsive to a plurality of series of impulses received over said trunk line for repeating said plurality of series of impulses to said switching equipment to select the called line, means in said second trunk circuit responsive to the first series of impulses received over said trunk line for connecting said toll marking potential to said control conductor, an answering supervisory potential, means in said switching equipment responsive to an answering operation at the called line for connecting said answering supervisory potential to said control conductor, and means in said second trunk circuit responsive to said answering supervisory potential for disconnecting said toll marking potential from said control conductor.

References Cited in the file of this patent

UNITED STATES PATENTS

| | | |
|---|---|---|
| 2,431,321 | Gohorel | Nov. 25, 1947 |
| 2,678,355 | Pharis | May 11, 1954 |